(12) United States Patent
Woodman et al.

(10) Patent No.: US 11,134,181 B2
(45) Date of Patent: Sep. 28, 2021

(54) REMOTE IMAGE CAPTURE AND MOUNTING ECOSYSTEM

(71) Applicant: GoPro, Inc., San Mateo, CA (US)

(72) Inventors: Nicholas D. Woodman, Woodside, CA (US); Daniel J. Coster, San Francisco, CA (US); Joshua T. Druker, Redwood City, CA (US)

(73) Assignee: GoPro, Inc., San Mateo, CA (US)

( * ) Notice: Subject to any disclaimer, the term of this patent is extended or adjusted under 35 U.S.C. 154(b) by 22 days.

(21) Appl. No.: 16/462,738

(22) PCT Filed: Jan. 3, 2018

(86) PCT No.: PCT/US2018/012183
§ 371 (c)(1),
(2) Date: May 21, 2019

(87) PCT Pub. No.: WO2018/129041
PCT Pub. Date: Jul. 12, 2018

(65) Prior Publication Data
US 2019/0369465 A1 Dec. 5, 2019

Related U.S. Application Data

(60) Provisional application No. 62/557,332, filed on Sep. 12, 2017, provisional application No. 62/441,799, filed on Jan. 3, 2017.

(51) Int. Cl.
*H04N 5/225* (2006.01)
*G03B 17/56* (2021.01)
*H04N 5/232* (2006.01)

(52) U.S. Cl.
CPC ......... *H04N 5/2251* (2013.01); *G03B 17/561* (2013.01); *H04N 5/2252* (2013.01);
(Continued)

(58) Field of Classification Search
CPC .............. G03B 17/561; G03B 2206/00; H04N 5/2252; H04N 5/23206; H04N 2201/0056; H04N 2201/0058; H04N 5/2251
See application file for complete search history.

(56) References Cited

U.S. PATENT DOCUMENTS 2,187,449 A * 1/1940 French ................... G03B 29/00
396/341
3,780,918 A * 12/1973 Curtis .................... A44C 5/003
224/165
(Continued)

FOREIGN PATENT DOCUMENTS

CA 2275784 12/1999
KR 101064599 B1 * 9/2011

OTHER PUBLICATIONS

Blum, Smart Camera Module for Wearable Band, U.S. Appl. No. 62/419,313 (Year: 2016).*
(Continued)

*Primary Examiner* — Chiawei Chen
(74) *Attorney, Agent, or Firm* — Young Basile Hanlon & MacFarlane, P.C.

(57) ABSTRACT

This disclosure describes a system including an imaging device. The imaging device includes an imaging unit with a lens that focuses light onto an image sensor that produces image data, wherein the image data is only stored by the imaging device for transfer to and processing by an external device. The imaging device includes a control interface that provides commands to the imaging unit. The system also includes a mount with a wall that releasably secures the imaging device and provides access to the control interface and a securing structure that secures the mount to a variety of locations.

20 Claims, 13 Drawing Sheets

(52) U.S. Cl.
CPC ..... *H04N 5/23206* (2013.01); *G03B 2206/00* (2013.01); *H04N 2201/0056* (2013.01); *H04N 2201/0058* (2013.01)

(56) References Cited

U.S. PATENT DOCUMENTS

| | | | | |
|---|---|---|---|---|
| 5,948,086 | A * | 9/1999 | Lin | H04N 5/2251 710/100 |
| 5,995,763 | A * | 11/1999 | Posa | G02B 7/40 396/105 |
| 6,275,882 | B1 * | 8/2001 | Cheever | G06F 1/1632 710/302 |
| 6,346,886 | B1 * | 2/2002 | De La Huerga | G07C 9/28 340/573.1 |
| 6,513,532 | B2 * | 2/2003 | Mault | A61B 5/02055 600/595 |
| 8,199,251 | B2 | 6/2012 | Woodman | |
| 8,767,392 | B2 * | 7/2014 | Wang | G06F 1/1686 361/679.55 |
| 8,837,928 | B1 | 9/2014 | Clearman | |
| 9,152,194 | B2 * | 10/2015 | Yurchenco | F16B 47/003 |
| 9,423,673 | B2 | 8/2016 | Clearman | |
| 9,507,325 | B1 * | 11/2016 | Barrie | G04G 21/04 |
| 9,628,707 | B2 * | 4/2017 | Blum | H04N 5/23206 |
| 9,870,100 | B2 * | 1/2018 | Yi | G06F 3/041661 |
| 10,331,083 | B1 * | 6/2019 | Ness | G06F 3/0488 |
| 10,528,780 | B2 * | 1/2020 | Lim | G06F 1/163 |
| 2001/0017663 | A1 * | 8/2001 | Yamaguchi | H04N 1/2112 348/373 |
| 2002/0186317 | A1 * | 12/2002 | Kayanuma | H04N 5/2251 348/373 |
| 2002/0196360 | A1 * | 12/2002 | Miyadera | H04N 1/00127 348/373 |
| 2003/0071791 | A1 * | 4/2003 | Hanson | H04M 1/21 345/169 |
| 2004/0200868 | A1 * | 10/2004 | Woodman | F16M 13/00 224/221 |
| 2004/0225796 | A1 * | 11/2004 | Hanson | G06K 7/0013 710/301 |
| 2005/0174468 | A1 * | 8/2005 | Herranen | H04N 5/2251 348/340 |
| 2005/0185090 | A1 * | 8/2005 | Purdy | H04M 1/0262 348/376 |
| 2007/0030442 | A1 * | 2/2007 | Howell | G02C 11/10 351/158 |
| 2008/0158367 | A1 * | 7/2008 | Ohmura | H04N 21/4223 348/207.1 |
| 2010/0060747 | A1 | 3/2010 | Woodman | |
| 2010/0316369 | A1 * | 12/2010 | Pyle | G03B 17/00 396/423 |
| 2012/0069232 | A1 * | 3/2012 | Chui | G03B 17/00 348/333.01 |
| 2012/0207463 | A1 * | 8/2012 | Sherwood | F16M 11/041 396/428 |
| 2012/0275025 | A1 | 11/2012 | Parrill | |
| 2013/0087593 | A1 * | 4/2013 | Ivarez | A45F 5/00 224/576 |
| 2013/0201158 | A1 * | 8/2013 | Lee | G06F 3/0425 345/175 |
| 2014/0139637 | A1 | 5/2014 | Mistry | |
| 2014/0354832 | A1 * | 12/2014 | Iwamoto | H04N 5/23203 348/207.11 |
| 2015/0335420 | A1 * | 11/2015 | Blum | H02J 50/10 623/6.22 |
| 2016/0004142 | A1 | 1/2016 | Zhang | |
| 2016/0073023 | A1 * | 3/2016 | Rondinelli | H04N 5/23238 348/36 |
| 2016/0116828 | A1 | 4/2016 | Clearman | |
| 2016/0277649 | A1 | 9/2016 | Taran Katz | |
| 2017/0068276 | A1 * | 3/2017 | Wagman | G06F 1/1683 |
| 2017/0115713 | A1 * | 4/2017 | Shin | H04W 52/028 |
| 2017/0237459 | A1 * | 8/2017 | Kim | H04N 21/4223 455/575.6 |
| 2018/0020193 | A1 * | 1/2018 | Blum | H04N 5/2256 |
| 2018/0102077 | A1 * | 4/2018 | Lin | G02B 27/0093 |
| 2018/0109765 | A1 * | 4/2018 | Wu | H04N 5/2252 |
| 2019/0156096 | A1 * | 5/2019 | Lin | G02B 6/4214 |
| 2020/0093014 | A1 * | 3/2020 | Merenda | G06F 1/1656 |

OTHER PUBLICATIONS

International Preliminary Report on Patentability for Application No. PCT/US2018/012183, dated Jul. 18, 2019, 14 pages.
PCT International Search Report and Written Opinion for PCT/US2018/012183 dated May 23, 2018, 20 pages.

* cited by examiner

REMOTE IMAGE CAPTURE AND MOUNTING ECOSYSTEM

CROSS-REFERENCE TO RELATED APPLICATION(S)

This application claims priority to International Application Patent Serial No. PCT/US2018/012183, filed Jan. 3, 2018, as well as priority to and the benefit of U.S. Provisional Application Patent Ser. No. 62/557,332, filed Sep. 12, 2017, and priority to and the benefit of U.S. Provisional Application Patent Ser. No. 62/441,799, filed Jan. 3, 2017, the entire disclosures of which are hereby incorporated by reference.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

TECHNICAL FIELD

The present disclosure relates generally to digital image and/or video capture, and more particularly to mounting and capturing images and/or video with a remote imaging device.

BACKGROUND

Imaging devices capture images and videos using one or more lenses that gather light to be focused onto an image sensor. Ease of use and convenience of mounting or carrying imaging devices is important to users that record both day-to-day and high-intensity activities. Smaller devices with simpler interfaces may attract a wider number of users. However, providing extensive processing, storage, and/or capability to smaller imaging devices may be difficult with tight packaging constraints and limited interface options. An imaging device that is easy to mount in a variety of ways, that is small and unobtrusive, that includes an easy-to-use interface, and that provides for remote control and processing capabilities can beneficially improve a user's experience with the imaging device.

All Figures disclosed herein are © Copyright 2017 GoPro Inc. All rights reserved.

DETAILED DESCRIPTION

Implementations of the present technology will now be described in detail with reference to the drawings, which are provided as illustrative examples so as to enable those skilled in the art to practice the technology. Notably, the figures and examples below are not meant to limit the scope of the present disclosure to a single implementation or embodiment, but other implementations and embodiments are possible by way of interchange of or combination with some or all of the described or illustrated elements. Wherever convenient, the same reference numbers will be used throughout the drawings to refer to same or like parts.

A remote imaging device, small in size, light in weight, and easily portable, is described for use with a variety of mounting systems that enable seamless capture of high quality images in situations that would otherwise require a more complicated process, for example, of retrieving a smart phone, unlocking the smart phone, launching a camera application on the smart phone, and capturing an image or recording a video. The remote imaging device may be designed to couple with various separate devices through use of the mounting systems, allowing automatic offload of captured image content as well as image processing.

Figure 1:
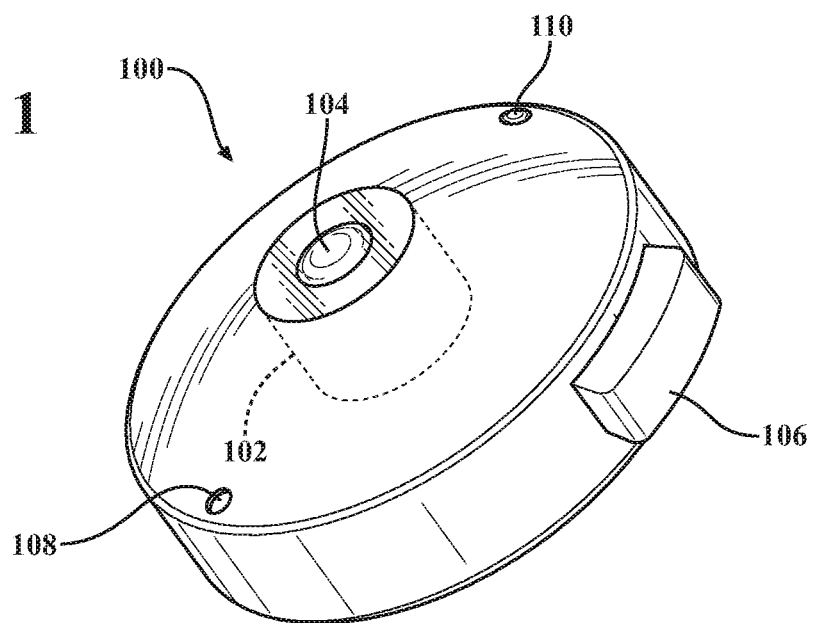
FIG. 1 shows a top perspective view of a remote imaging device.

FIG. 1 shows a top perspective view of a remote imaging device 100 with a body having a disc-like shape. The remote imaging device 100 may be smaller in size and lighter in weight, having, for example, a height between 15 mm and 25 mm and a diameter between 30 mm and 40 mm such that the remote imaging device 100 is highly portable. The remote imaging device 100 may include an imaging unit 102. The imaging unit 102 may include an optical element such as a lens 104 that captures light for the imaging unit 102. The lens 104 in this is example is located on an upper, curved surface of the remote imaging device 100 as shown. The lens 104 may be a standard lens, a macro lens, a zoom lens, a special-purpose lens, a telephoto lens, a prime lens, an achromatic lens, an apochromatic lens, a process lens, a wide-angle lens, an ultra-wide-angle lens, a fisheye lens, an infrared lens, an ultraviolet lens, a perspective control lens, another lens, and/or another optical element.

The lens 104 of the imaging unit 102 may focus captured light onto one or more image sensors (not shown). The image sensors may include one or more of a charge-coupled device (CCD) sensor, an active pixel sensor (APS), a complementary metal-oxide semiconductor (CMOS) sensor, an N-type metal-oxide-semiconductor (NMOS) sensor, and/or another image sensor. The image sensor may capture light waves gathered by the lens 104 to produce image data based, for example, on control signals from the imaging unit 102. The imaging unit 102 may also include an integrated and/or removable battery (not shown) and a limited, integrated and/or removable electronic storage (not shown) that may store image data produced by the image sensor.

In some examples, the imaging unit 102 may communicate with a remote device in order to send and/or receive commands, send and/or receive image information, and/or perform imaging operations. For example, the remote imaging device 100 can include wireless (or wired) communication capabilities to interface with a smart phone, tablet, smart watch, etc. in order to use camera applications, social media applications, gaming applications, messaging applications, fitness or monitoring applications, settings applications, etc. The imaging unit 102 may include the ability to both capture and transfer still images and short video clips for use with the above applications. Transfer may occur wirelessly, for example, using WiFi or BTLE.

The remote imaging device 100 may include a control interface 106, such as a button. The control interface 106 in the example of FIG. 1 is disposed on a side surface of the body of the remote imaging device 100, though other locations for the control interface 106, such as the top surface of the remote imaging device 100, are also possible. The control interface 106 may be used to provide commands to the imaging unit 102, such as to capture an image, start and/or stop capturing video, start and/or stop charging, start and/or stop data transfer, or other commands, for example, taking the form of various combinations of presses or taps against the control interface 106. Though the control interface 106 is shown here as a button, other interfaces such as audio interfaces, sliders, touch pads, capacitive sensors, heat sensors, and/or other interfaces may be used to receive commands from a user for the imaging unit 102.

The remote imaging device 100 may include one or more sensors 108, for example, disposed on an upper surface of the remote imaging device 100 or in communication with the imaging unit 102 and/or the control interface 106. The sensors 108 may be configured to capture audio information (e.g., using a microphone to capture voice commands), biometric information (e.g., using a proximity sensor, a heart rate sensor, a heat detection sensor, and/or a sensor that determines gaze direction), or any other information useful for the imaging unit 102 to configure operation of the remote imaging device 100. For example, the sensors 108 may include an accelerometer and/or gyroscope configured to determine user interaction with the remote imaging device 100 representative of intended recording or capture by the remote imaging device 100 (e.g., placing the remote imaging device 100 in one of the below described mounts or cases). In this example, the imaging unit 102 may be configured to begin image capture such that buffered information is available in memory prior to receipt of an indication to record through the control interface 106. In some embodiments, the buffer may be saved in response to a record indication received through the control interface 106 and may be overwritten if a record indication is not received within a predetermined time.

The remote imaging device 100 may include an indicator 110, for example, in the form of a light-emitting device (e.g., LED) or an audio speaker, as shown in this example as disposed on a top surface of the remote imaging device 100. The indicator 110 may be used to provide a mode indication, a power indication, a connection indication, or other information relevant to operation of the remote imaging device 100 to the user and/or to other individuals nearby the user.

In the case where the indicator 110 is a light-emitting device, different colors or different patterns of light may be emitted in order to represent various modes, power states, or connection statuses. In one example, the indicator 110 may blink in a specific color sequence or pattern to indicate that image capture has occurred or is ongoing. The indicator 110 may be designed to avoid interference with image capture by the imaging unit 102. In the case where the indicator 110 is a speaker, various patterns of beeps or haptic vibratory buzzes may be emitted in order to represent various modes, power states, or connection statuses. For example, the indicator 110 may be configured to emit a quieter series of beeps to indicate stopping and/or starting of image capture.

Figure 2:
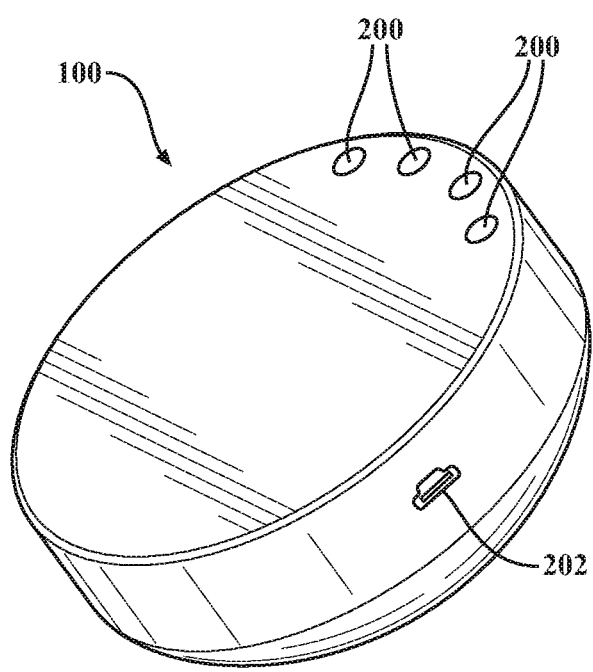
FIG. 2 shows a bottom perspective view of the remote imaging device of FIG. 1.

FIG. 2 shows a bottom perspective view of the remote imaging device 100 of FIG. 1. The remote imaging device 100 includes an input/output (I/O) module 200 formed of several electronic contact locations suitable to couple an external device (not shown). The external device may be set adjacent to, press fit, and/or otherwise coupled to the I/O module 200 so as to use the external device to provide communication with the imaging unit 102 within the remote imaging device 100. Though the I/O module 200 of FIG. 2 is shown as including electronic contact locations, other types of I/O modules are possible.

The remote imaging device 100 may include another I/O module 202. The I/O module 202 may include a wired interface (e.g., USB, USB-C, HDMI, and/or other interfaces) configured to communicate to one or more external devices. For example, the I/O module 202 may include a wired power interface to an external energy source (e.g., a battery, a DC electrical source, and/or other energy sources) that supplies charge to the imaging unit 102. Though the I/O modules 200, 200 are shown on bottom and side surfaces of the remote imaging device 100, other locations (or swapped locations) are also possible.

The remote imaging device 100 of FIGS. 1 and 2 is small in size, light in weight, and simple in construction, including basic components as described above within the imaging unit 102 that are sufficient to capture and store a predetermined amount of image and video data with limited user interaction, for example, through the control interface 106. For example, the remote imaging device 100 may be configured to provide a lower resolution broadcast video stream for a predetermined amount of time, for example, in 10 second clips or 30 second clips. The remote imaging device 100 is intended to operate independently for at least a predetermined period of time, for example, 15 to 45 minutes, without requiring an interface to separate components that provide, for example, processing, display, data transfer, and/or charging capabilities.

Though shown as having a round or cylindrical shape, the remote imaging device 100 may alternatively have a cubic shape, spherical shape, pyramidal shape, and/or any other shape suitable both for easy portability and for image capture by the imaging unit 102. The remote imaging device 100 may be water resistant and/or waterproof to a specified depth (e.g., between 1 m to 5 m) such that the remote imaging device 100 may be used to capture images and video in wet or moist environments. The imaging unit 102 may also be configured to automatically adjust image capture based on the presence of water detected, for example, by the image sensor as present on the lens 104.

In some embodiments, various functions of the remote imaging device 100 described in respect to FIGS. 1-2 may be physically combined with the various mounts and cases described, for example, in FIGS. 3-8 and FIGS. 12-24.

Figure 3:
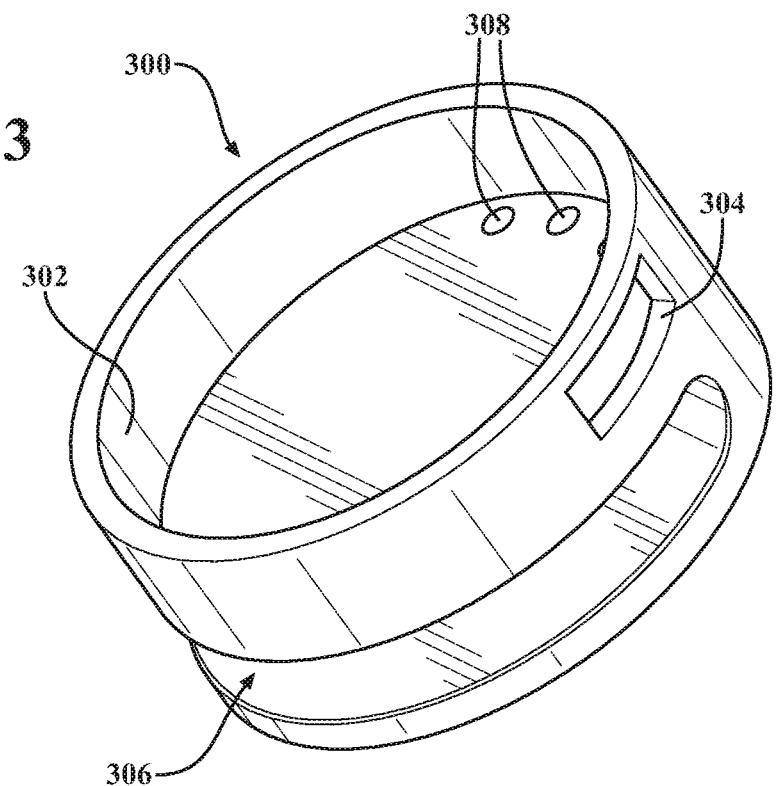
FIG. 3 shows a top perspective view of a mount for use with the remote imaging device of FIGS. 1 and 2.

FIG. 3 shows a top perspective view of a housing or mount 300 for use with the remote imaging device 100 of FIGS. 1 and 2. The mount 300 of FIG. 3 is round in shape with a vertically-extending wall 302 designed to capture sides of the remote imaging device 100, for example, in a flexible, press-fit manner to releasably secure the remote imaging device 100 within the mount 300. The wall 302 may form a cavity that receives the remote imaging device 100. The mount 300 may have a small form factor (e.g., a diameter between 35 mm and 45 mm and a depth between 25 mm and 50 mm) and may be lightweight as well. The mount 300 may be formed from semi-rigid materials such as plastic, metal, fiberglass, etc. or more pliable or substantially pliable materials such as leather, vinyl, neoprene, etc.

The wall 302 of the mount 300 may define an opening 304 that allows a user to directly manipulate the control interface 106 of the remote imaging device 100. In another example (not shown), the opening 304 may be covered with a thin and/or pliable material to allow the user to indirectly manipulate the control interface 106 of the remote imaging device 100. The mount 300 may be configured for use in various environments. For example, the mount 300 may itself be waterproof and/or include a waterproof enclosure (not shown) that protects the remote imaging device 100 from water when used, for example, while surfing or scuba diving.

The mount 300 may include a securing structure 306 for securing the mount 300 to a variety of locations. In the example of FIG. 3, the securing structure 306 has a slot and a clamp- or clip-type mechanism used, for example, to slidably and compressibly secure the mount 300 to items such as backpacks, clothing, window treatments, etc. The securing structure 306 may include opposed magnets, a spring-based hinge, a mechanical clamp, or any other mechanism suitable to slide and then secure opposing sides of the mount 300 to a location desired by the user.

The mount 300 may include an I/O module 308 formed of several electronic contact locations suitable to couple the remote imaging device 100 of FIGS. 1 and 2. For example, the electronic contact locations of the I/O module 200 of the remote imaging device 100 may be aligned and press fit against the electronic contact locations of the I/O module 308 in the mount 300 such that the remote imaging device 100 and the mount 300 are electrically coupled when the mount 300 secures the remote imaging device 100. Though the I/O module 308 of FIG. 3 is shown as including electronic contact locations, other types of I/O modules for use in an interface to the remote imaging device 100 are also possible.

Figure 4:
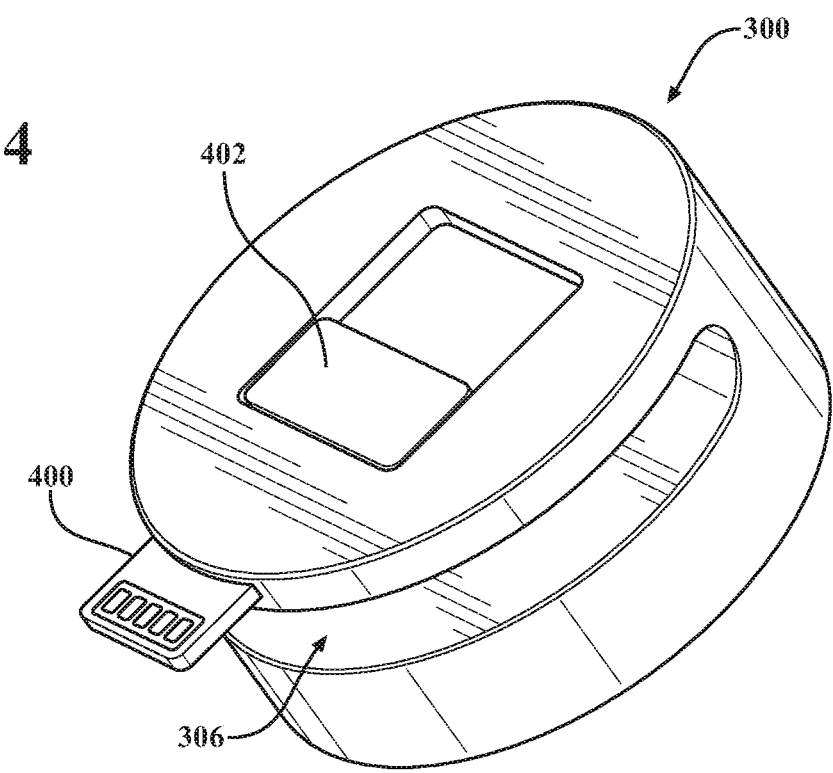
FIG. 4 shows a bottom perspective view of the mount of FIG. 3.

FIG. 4 shows a bottom perspective view of the mount 300 of FIG. 3. Another I/O module 400 is disposed on a bottom surface of the securing structure 306. The I/O module 400 may include a wired and/or wireless communications interface (e.g., WiFi, Bluetooth, USB, HDMI, Wireless USB, and/or other interfaces) configured to allow the coupled remote imaging device 100 of FIGS. 1 and 2 to communicate with one or more external devices (not shown) when secured within the mount 300. The I/O module 400 may also include a wired and/or wireless power interface to an external energy source (e.g., a battery, a DC electrical source, and/or other energy sources) that supplies a charge to the imaging unit 102 of the remote imaging device 100 when secured within the mount 300.

The mount 300 also includes an adjustment mechanism 402 that allows the I/O module 400 to move in and out of the bottom surface of the securing structure 306. In this example, the adjustment mechanism 402 is a slider mechanism that allows the I/O module 400 to extend and retract from a slot within a lower portion of the securing structure 306. By retracting the I/O module 400 when not in use, connection components of the I/O module 400 can be protected during use of the mount 300.

Figure 5:
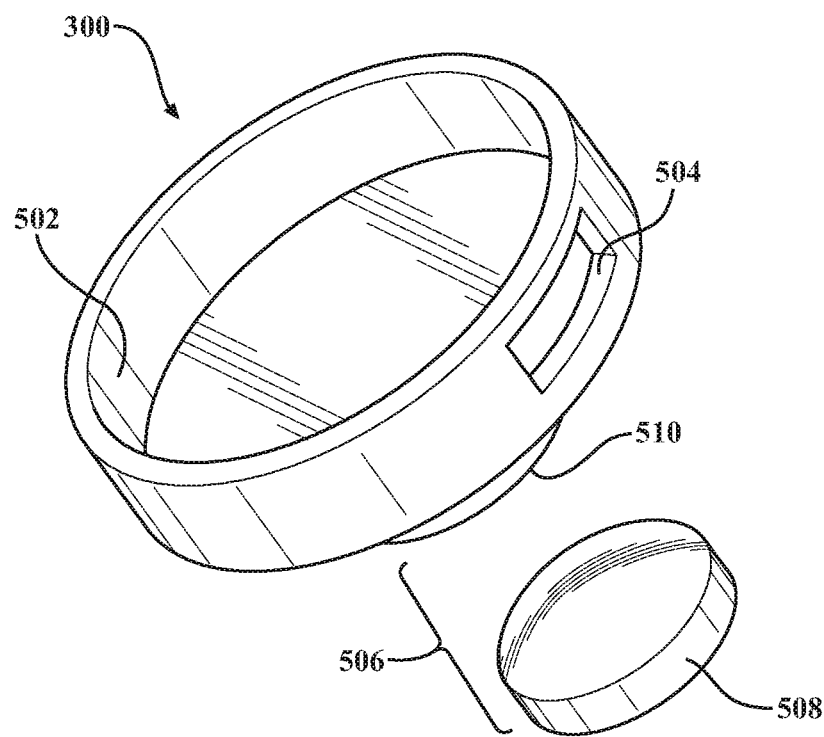
FIG. 5 shows a top perspective view of another mount for use with the remote imaging device of FIGS. 1 and 2.

FIG. 5 shows a top perspective view of another mount 500 for use with the remote imaging device 100 of FIGS. 1 and 2. The mount 500 is round in shape with a vertically-extending wall 502 designed to capture sides of the remote imaging device 100, for example, in a flexible, press-fit manner so as to releasably secure the remote imaging device 100 within the mount 500. The wall 502 may form a cavity that receives the remote imaging device 100. The mount 500 may have a small form factor (e.g., a diameter between 35 mm and 45 mm and a depth between 25 mm and 35 mm) and may be lightweight as well. The mount 500 may be formed from semi-rigid materials such as plastic, metal, fiberglass, etc. or more pliable or substantially pliable materials such as leather, vinyl, neoprene, etc.

The wall 502 of the mount 500 may define an opening 504 that allows a user to directly manipulate the control interface 106 of the remote imaging device 100. In another example (not shown), the opening 504 may be covered with a thin and/or pliable material to allow the user to indirectly manipulate the control interface 106 of the imaging device 100. The mount 500 may be configured for use in various environments. For example, the mount 500 may itself be waterproof and/or include a waterproof enclosure (not shown) that protects the imaging device 100 from water when used, for example, while surfing or scuba diving.

The mount 500 may include a securing structure 506 for securing the mount 500 to a variety of locations in a variety of positions. In the example of FIG. 5, the securing structure 506 includes two parts or halves: a domed structure 508 to be secured either fixedly or removably in a variety of locations and a cupped structure 510 to be seated against the domed structure 508 in a variety of adjustable positions. One part of the securing structure 506 (that is, either the domed structure 508 or the cupped structure 510) may be magnetic while the other part (that is, the other of the domed structure 508 and the cupped structure 510) may be metallic so as to be attractable to the magnetic part. The domed structure 508 may include other mounting features, such as a suction cup (no shown), for positioning the domed structure 508 on various surfaces.

Figure 6:
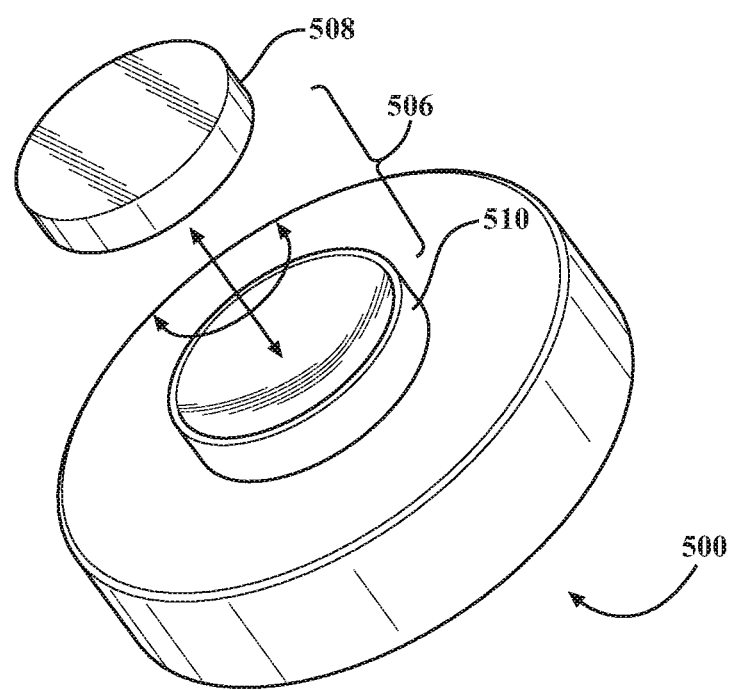
FIG. 6 shows a bottom perspective view of the mount of FIG. 5.

FIG. 6 shows a bottom perspective view of the mount 500 of FIG. 5. The concavity of the cupped structure 510 is shown as shaped to receive a domed surface of the domed structure 508. A curved bi-directional arrow located between the spaced domed structure 508 and the cupped structure 510 represents potential positions of the cupped structure 510 in reference to the domed structure 508. A straight bi-directional arrow extending between the spaced domed structure 508 and the cupped structure 510 represents mounting and dismounting the separate halves of the securing structure 506.

The domed structure 508 can include an adhesive (not shown) or other securing mechanism on a flat surface (that opposes the domed surface) to aid in positioning the domed structure 508 on a variety of different surfaces such as tables, walls, etc. In one example, magnetic attraction between the domed structure 508 and the cupped structure 510 may be such that a thinner piece of paper, fabric, or other material may be placed between the domed structure 508 and the cupped structure 510 when secured. Attaching the opposing halves of the securing structure 506 to opposing sides of paper, fabric, or other material allows the mount 500 to be secured, for example, to a pocket of a user or curtains covering a window. For example, the user may place the domed structure 508 inside a shirt pocket and couple the cupped structure 510 to the outside of the shirt pocket to be held in place by the domed structure 508, the pocket being sandwiched between the domed structure 508 and the cupped structure 510.

Figure 7:
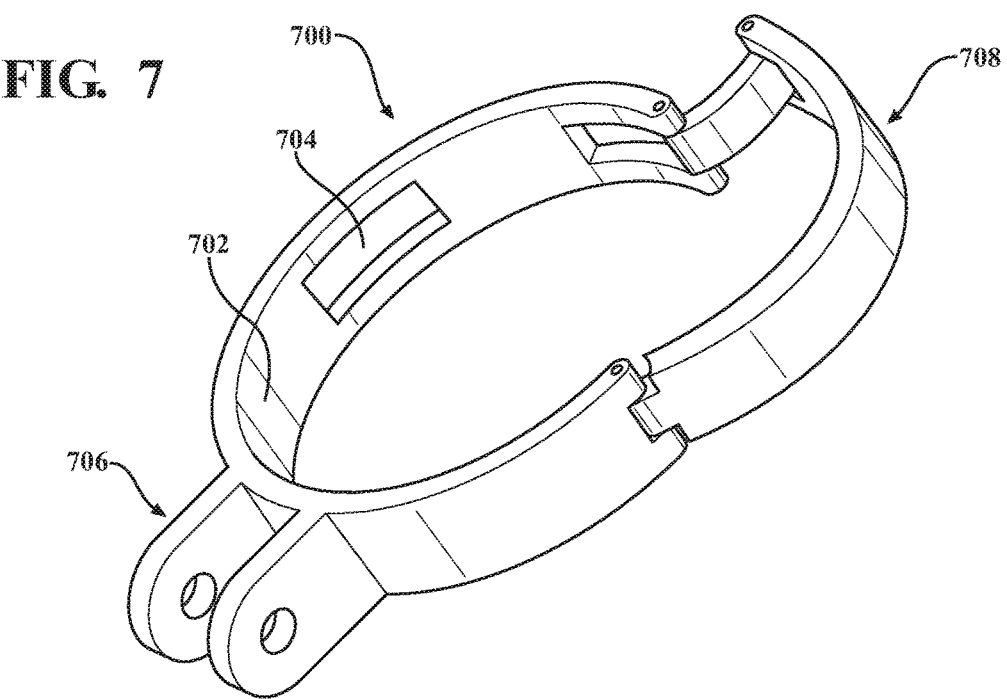
FIG. 7 shows a perspective view of another mount for use with the remote imaging device of FIGS. 1 and 2 in an open position.

FIG. 7 shows a perspective view of another mount 700 for use with the remote imaging device 100 of FIGS. 1 and 2. The mount 700 has a ring-like shape formed by a frame or wall 702 designed to capture sides of the remote imaging device 100. The mount 700 may be formed from semi-rigid materials such as plastic, metal, fiberglass, etc. or more pliable or substantially pliable materials such as vinyl, neoprene, etc. The mount 700 may have a small form factor (e.g., a diameter between 35 mm and 45 mm and a depth between 15 mm and 35 mm) and may be lightweight as well.

The wall 702 of the mount 700 may define an opening 704 that allows a user to directly manipulate the control interface 106 of the imaging device 100. In another example (not shown), the opening 704 may be covered with a thin and/or pliable material to allow the user to indirectly manipulate the control interface 106 of the imaging device 100. The mount 700 may be configured for use in various environments. For example, the mount 700 may itself be waterproof and/or include a waterproof enclosure (not shown) that protects the imaging device 100 from water when used, for example, while surfing or scuba diving.

The mount 700 may include a securing structure 706 for securing the mount 700 to another securing structure (not shown). The securing structure 706 in FIG. 7 includes a pair of protrusions, each including an opening configured to receive a coupling mechanism, for instance, a rod or screw, used to pivotally couple the securing structure 706 to another securing structure including a plurality of reciprocal protrusions and openings. Various reciprocal securing structures are further described in reference to FIG. 9. For example, the securing structure 706 may be a ball and socket structure.

The mount 700 may include another securing structure 708 for releasably securing the remote imaging device 100 within the wall 702 of the mount 700 such as those described in, e.g., U.S. patent application Ser. No. 13/949,160 entitled "CAMERA HOUSING," filed on Jul. 23, 2013, now U.S. Pat. No. 8,837,928, the foregoing being incorporated herein by reference in its entirety. The securing structure 708 in FIG. 7 is in an open position such that the remote imaging device 100 can be easily inserted or removed from within the wall 702 of the mount 700. In other words, with the securing structure 708 in the open position, the mount 700 would not retain the remote imaging device 100 in place within the wall 702.

Figure 8:
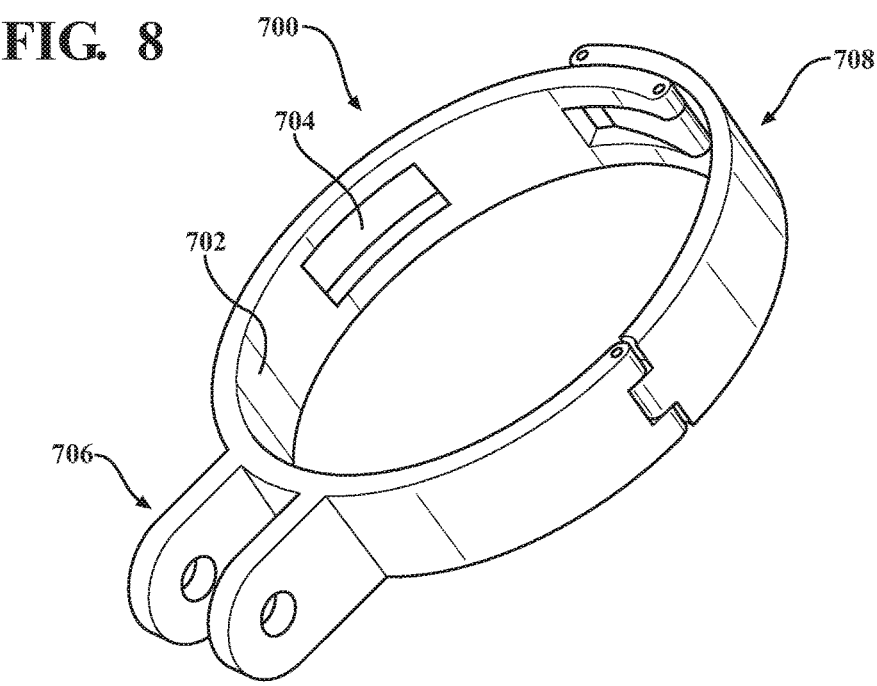
FIG. 8 shows a perspective view of the mount of FIG. 7 in a closed position.

FIG. 8 shows a perspective view of the mount 700 of FIG. 7 in a closed position. That is, the securing structure 708 in FIG. 8 is shown as clamped or closed such that the remote imaging device 100 would be securely held within the wall 702 of the mount 700 with the wall 702 abutting side surfaces of the remote imaging device 100. The materials used for the securing structure 708 may include hinges, pins, clips, clamps, or other adjustment mechanisms such that the wall 702 of the mount may expand and retract to release and hold the remote imaging device 100 as needed.

Figure 9:
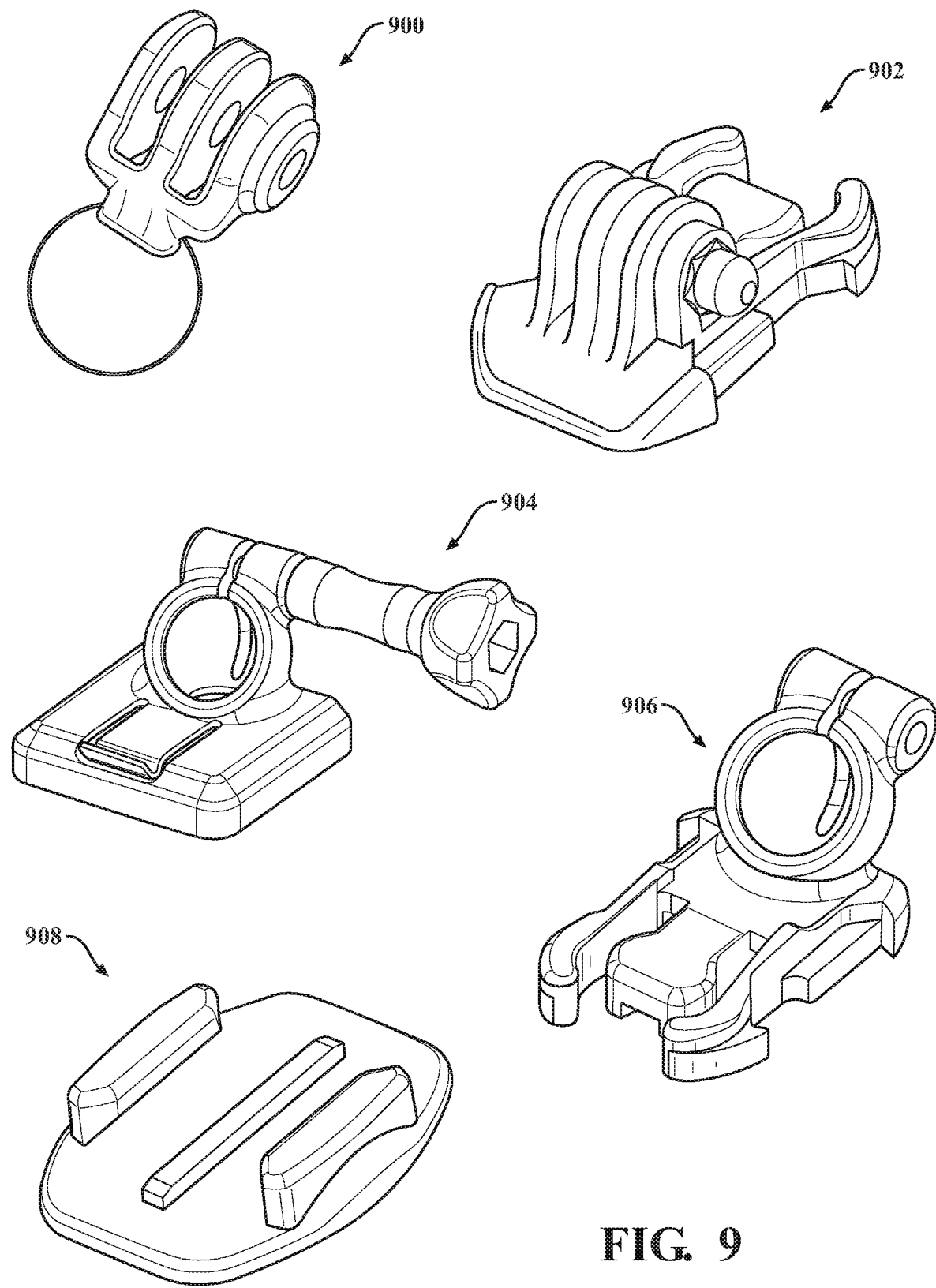
FIG. 9 shows a mounting ecosystem for use with the mount of FIGS. 7 and 8.

FIG. 9 shows a mounting ecosystem for use with the securing structure 706 of the mount 700 of FIGS. 7 and 8 such as the ecosystem described in, e.g., U.S. patent application Ser. No. 14/922,157 entitled "QUICK-RELEASE BALL-AND-SOCKET JOINT CAMERA MOUNT," filed on Oct. 25, 2015, now U.S. Pat. No. 9,423,673, the foregoing being incorporated herein by reference in its entirety.

The protrusions on the securing structure 706 of FIGS. 7 and 8 may be coupled to complementary protrusions on a top portion of securing structure 900 and/or securing structure 902 as shown in the mounting ecosystem of FIG. 9. The ball-shaped lower portion of the securing structure 900 may be coupled to the concave ball-receiving portion of securing structure 904 and/or securing structure 906. The clip-shaped lower portion of the securing structure 902 and/or the securing structure 906 may be slideably engaged with securing structure 908. Each of the securing structures 900, 902, 904, 906, 908 allow for a variety of mounting possibilities for the mount 700 shown in FIGS. 7 and 8.

Figure 10:
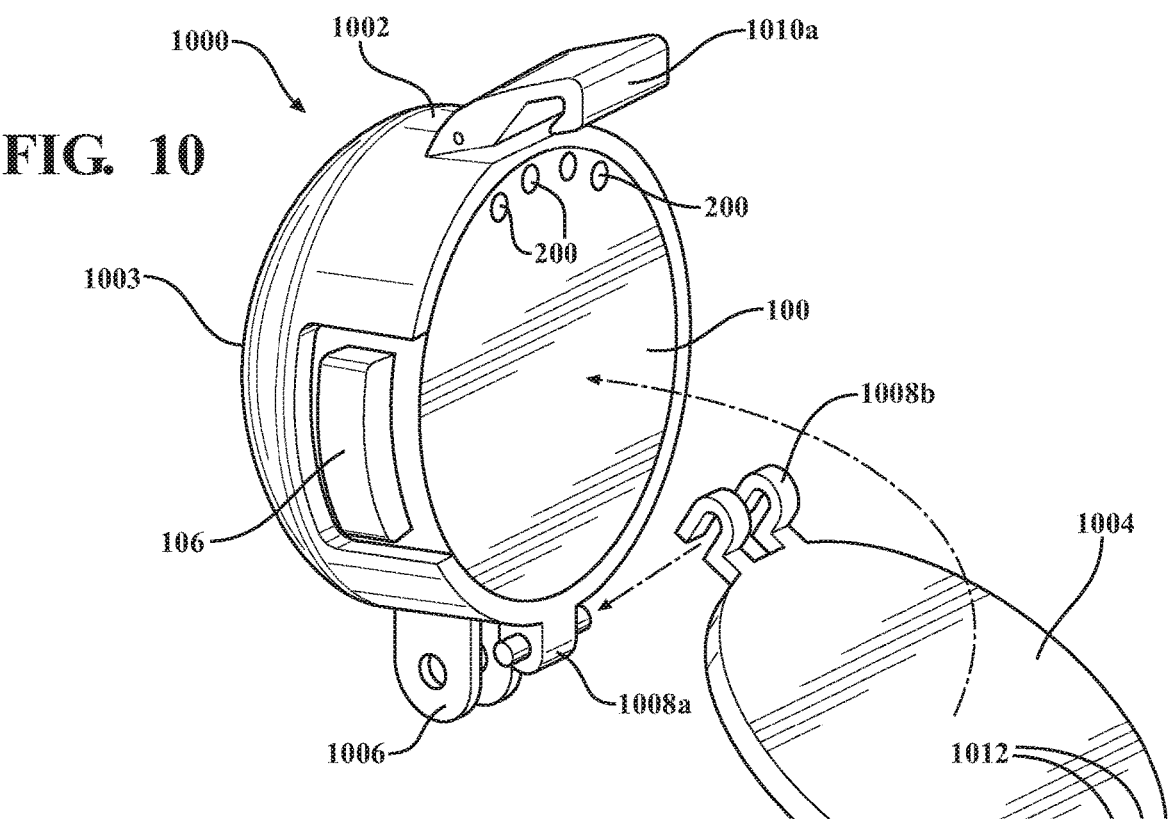
FIG. 10 shows a perspective view of a housing with an expansion module for use with the remote imaging device of FIGS. 1 and 2 in an open position.

FIG. 10 shows a perspective view of another mount in the form of a housing 1000 for use with the remote imaging device 100 of FIGS. 1 and 2, such as the housings described in, e.g., U.S. patent application Ser. No. 12/498,890 entitled "CAMERA HOUSING WITH INTEGRATED EXPANSION MODULE," filed on Jul. 7, 2009, now U.S. Pat. No. 8,199,251, the foregoing being incorporated herein by reference in its entirety.

The housing 1000 of FIG. 10 includes two housing portions 1002, 1004. The first housing portion 1002 includes walls that define a cavity that receives the remote imaging device 100. The second housing portion 1004 detachably couples with the first housing portion 1002 opposite a front face of the first housing portion 1002. The first housing portion 1002 and the second housing portion 1004 are collectively structured to enclose the remote imaging device 100 within the cavity of the first housing portion 1002 when the second housing portion 1004 is secured to the first housing portion 1002 in a closed position (see FIG. 11). The first and second housing portions 1002, 1004 can be formed of rigid, substantially rigid, pliable, or substantially pliable materials such as plastic, metal, fiberglass, leather, vinyl, neoprene, etc.

The walls of the first housing portion 1002 may include an opening that allows a user to directly manipulate the control interface 106 of the imaging device 100. The location of the control interface 106 is shown in FIG. 10 as disposed in the opening of of the first housing portion 1002. The housing 1000 may be configured for use in various environments. For example, the housing 1000 may be waterproof when in a closed position to protect the remote imaging device 100 from water when used, for example, while surfing or scuba diving.

The first housing portion 1002 may define an opening or cover 1003 to align with the lens 104 of the remote imaging device 100. The cover 1003 may be adapted for use with additional lenses to supplement the lens 104 of the remote imaging device 100 such as a wide-angle lens or any other specialized camera lens. The cover 1003 may be removeably attachable to the first housing portion 1002 and thus form a third portion of the housing 1000. The cover 1003 may include a waterproof seal so as to maintain the waterproof aspect of the housing 1000. Alternatively, the cover 1003 may be permanently fixed to the first housing portion 1002.

The first housing portion 1002 may include a securing structure 1006 for securing the housing 1000 to another securing structure such as the securing structures 900, 902 of FIG. 9. The securing structure 1006 shown in FIG. 10 includes a pair of protrusions, each including an opening configured to receive a coupling mechanism, for instance, a rod or screw, used to pivotally couple the securing structure 1006 to another securing structure including a plurality of reciprocal protrusions and openings.

The second housing portion 1004 opens and closes in respect to the first housing portion 1002 so that the remote imaging device 100 may be removed from the housing 1000. For example, the first and second housing portions 1002, 1004 may each include halves or portions of securing structures 1008a,b, 1010a,b. The securing structure 1008a,b (collectively, 1008) is a hinge-type mechanism allowing rotation of the second housing portion 1004 in relation to the first housing portion 1002. The securing structure 1010a,b (collectively 1010) is a clasp-type mechanism locking the second housing portion 1004 to the first housing portion 1002. In other examples, the securing structures 1008, 1010 can include buttons, buckles, clips, hooks, magnets, adhesives, or any other type of securing mechanism.

The second housing portion 1004 may include an I/O module 1012 formed of several electronic contact locations. The electronic contact locations of the I/O module 200 of the remote imaging device 100 may be aligned to and press fit against the electronic contact locations of the I/O module 1012 on the second housing portion 1004. That is, the remote imaging device 100 and the second housing portion 1004 may be electrically coupled when the housing 1000 secures the remote imaging device 100. Other types of I/O modules for use in an interface to the remote imaging device 100 are also possible.

Figure 11:
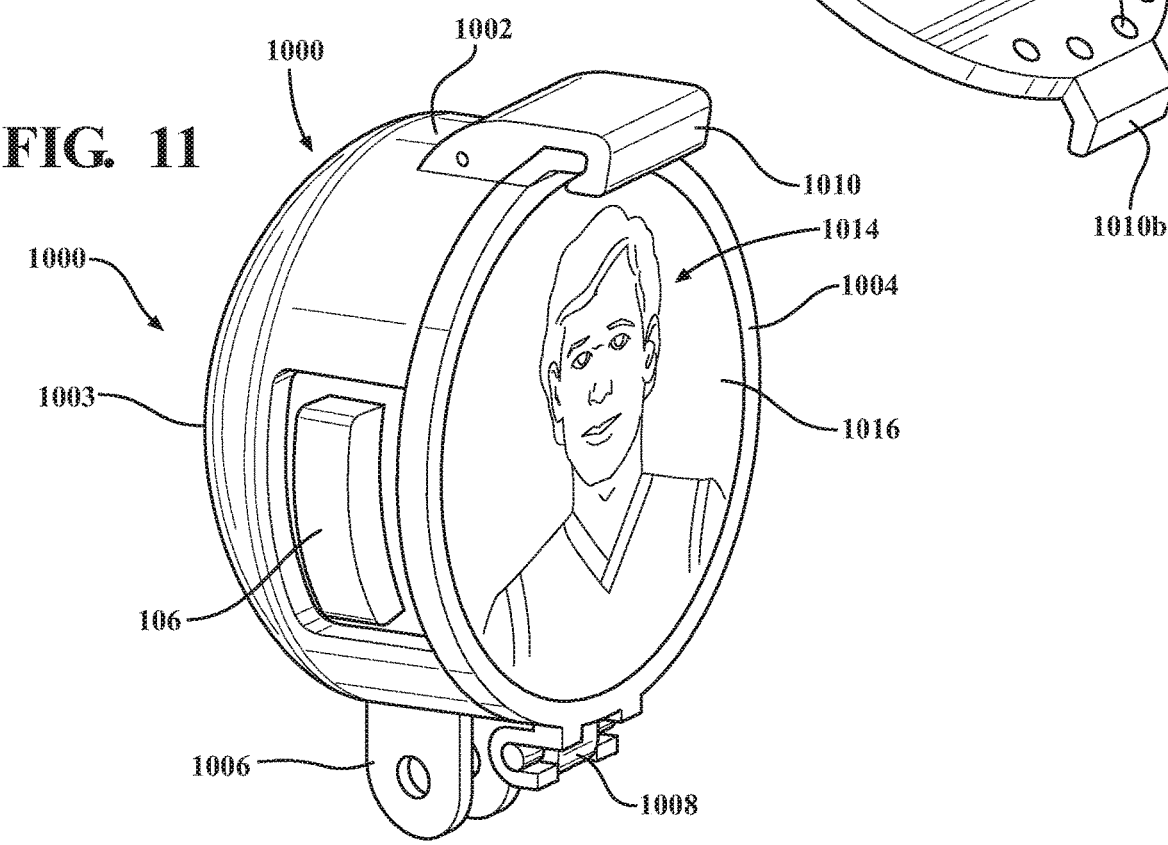
FIG. 11 shows a perspective view of the housing with the expansion module of FIG. 10 in a closed position.

FIG. 11 shows a perspective view of the housing 1000 of FIG. 10 in a closed position. The housing 1000 includes a display module 1014 with a display screen 1016 (e.g., a Liquid Crystal Display (LCD)) externally viewable from a back surface of the second housing portion 1004. The display module 1014 may include display control logic for adding display functions to the remote imaging device 100 since the remote imaging device 100 does not include a built-in or native display screen. For example, the display module 1014 may digitally display an image of an object currently in a field of view of the lens 104 of the remote imaging device 100 on the display screen 1016. This provides the user with a preview image before capturing images or recording video and allows the user to experience a field of view of the remote imaging device 100 without a native viewfinder. Additionally, the display module 1014 may allow the user to view previously captured and/or stored images or video.

Figure 12:
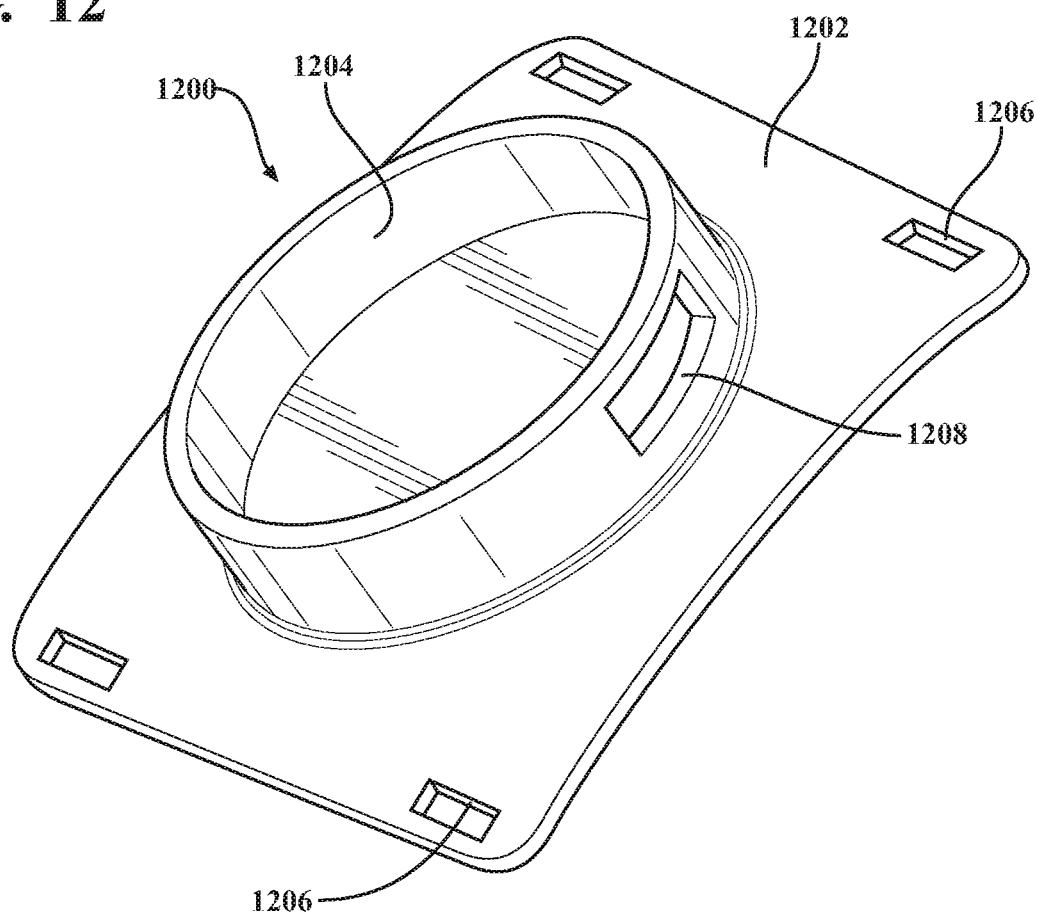
FIG. 12 shows a perspective view of another mount for use with the remote imaging device of FIGS. 1 and 2.

FIG. 12 shows a perspective view of another mount 1200 for use with the remote imaging device 100 of FIGS. 1 and 2. The mount 1200 includes a base 1202 and wall 1204 extending generally perpendicularly from the base 1202. The mount 1200 may have a small form factor and may be lightweight. The mount 1200 may be formed from semi-rigid materials such as plastic, metal, fiberglass, etc. or more pliable or substantially pliable materials such as rubber, leather, vinyl, neoprene, etc.

The base 1202 may be rectangular as shown or take any of a variety of shapes suitable to support the wall 1204. The wall 1204 may capture sides of the remote imaging device 100, for example, in a flexible, press-fit manner so as to releasably secure the remote imaging device 100 within the mount 1200. The base 1202 and the wall 1204 may together form a cavity that receives the remote imaging device 100.

The base 1202 of the mount 1200 may define one or more openings 1206 that allow a user to attach the mount 1200 to various surfaces. For example, the openings 1206 may be used to aid in securing the mount 1200 to an article of clothing or a backpack using thread, string, staples, pins, clips, or other attachment means. Though four openings 1206 are shown as located at corners of the base 1202, the base 1202 may include, for example, two slot-shaped openings (not shown) suitable for sliding the mount 1200 along a strap or a belt.

The wall 1204 of the mount 1200 may define another opening 1208 that allows a user to directly manipulate the control interface 106 of the remote imaging device 100. In another example (not shown), the opening 1208 may be covered with a thin and/or pliable material to allow the user to indirectly manipulate the control interface 106 of the imaging device 100. The mount 1200 may be configured for use in various environments. For example, the mount 1200 may itself be waterproof and/or include a waterproof enclosure (not shown) that protects the imaging device 100 from water when used, for example, while surfing or scuba diving.

Figure 13:
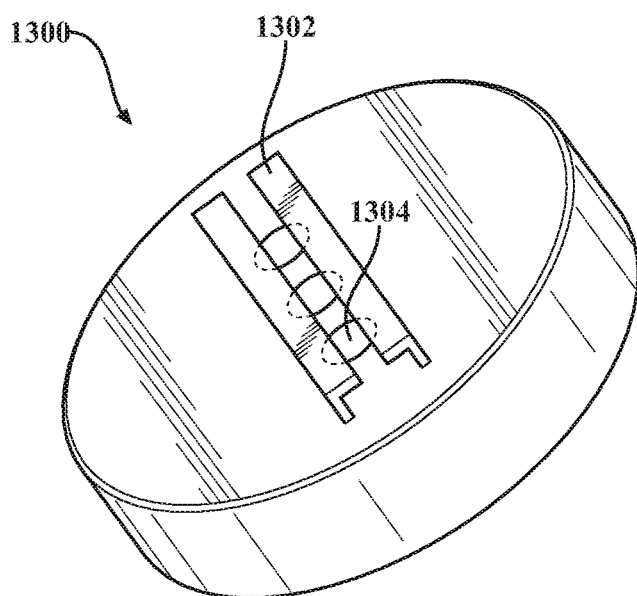
FIG. 13 shows a rear perspective view of another mount for use with the remote imaging device of FIGS. 1 and 2.

FIG. 13 shows a rear perspective view of another mount 1300 for use with the remote imaging device 100 of FIGS. 1 and 2. The front of the mount 1300 (not shown) may include a vertically-extending wall similar to the walls 302, 502, 1204 of FIGS. 3, 5, and 12 and an opening similar to the openings 304, 504, 1208 of FIGS. 3, 5, and 12. The mount 1300 may be formed from semi-rigid materials such as plastic, metal, fiberglass, etc. or more pliable or substantially pliable materials such as rubber, leather, vinyl, neoprene, etc.

The mount 1300 may include a securing mechanism in the form of a slot 1302 shaped to receive a rail, for example, in sliding, press-fit, or magnetic engagement. Here, the slot 1302 is straight, short in length, has a t-shape, and extends across a bottom surface of the round mount 1300. Additional shapes and lengths for the slot 1302 are also possible.

The mount 1300 may also include an I/O module 1304 formed of several electronic contact locations suitable to couple the remote imaging device 100 of FIGS. 1 and 2. For example, the electronic contact locations of the I/O module 200 of the remote imaging device 100 may be aligned and press fit against inside surfaces (not shown) of the electronic contact locations of the I/O module 1304 in the mount 1300. Thus, the remote imaging device 100 and the mount 1300 may be electrically coupled when the mount 1300 secures the remote imaging device 100. Though the I/O module 1304 of FIG. 13 is shown as including electronic contact locations, other types of I/O modules for use as an interface between the mount 1300 and the remote imaging device 100 are also possible.

Figure 14:
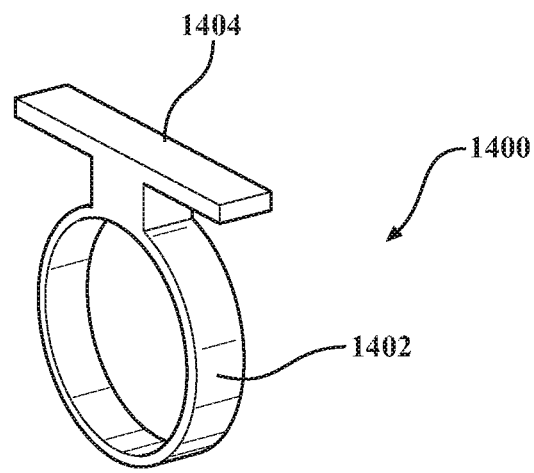
FIG. 14 shows a perspective view of a mount for use with the mount of FIG. 13.

FIG. 14 shows a perspective view of a mount 1400 for use with the mount 1300 of FIG. 13. The mount 1400 includes a ring 1402 and a rail 1404 extending generally perpendicularly from the ring 1402. The mount 1400 may be formed from semi-rigid materials such as plastic, metal, fiberglass, etc. or more pliable or substantially pliable materials such as rubber, leather, vinyl, neoprene, etc.

The ring 1402 of the mount 1400 may be worn, for example, on a finger of a user. The rail 1404 on the mount 1400 of FIG. 14 may be aligned and slideably engaged with, for example, the slot 1302 on the mount 1300 of FIG. 13. By coupling the rail 1404 of the mount 1400 with the slot 1302 of the mount 1300, the user may carry the remote imaging device 100 on an exterior (or interior) of a hand. In this mounted position, the remote imaging device 100 may be easily positioned based on gestures or other movements of the hand of the user.

Though shown without an I/O module or a control interface, the mount 1400 may include these features to take advantage, for example, of the I/O module 1304 included on the mount 1300 that electronically couples with the remote imaging device 100. For example, the mount 1400 may include an independent power source for the remote imaging device 100, a control interface that may be manipulated by the user to provide commands to the remote imaging device 100, and/or any other features suitable to provide an interface to the remote imaging device 100.

Figure 15:
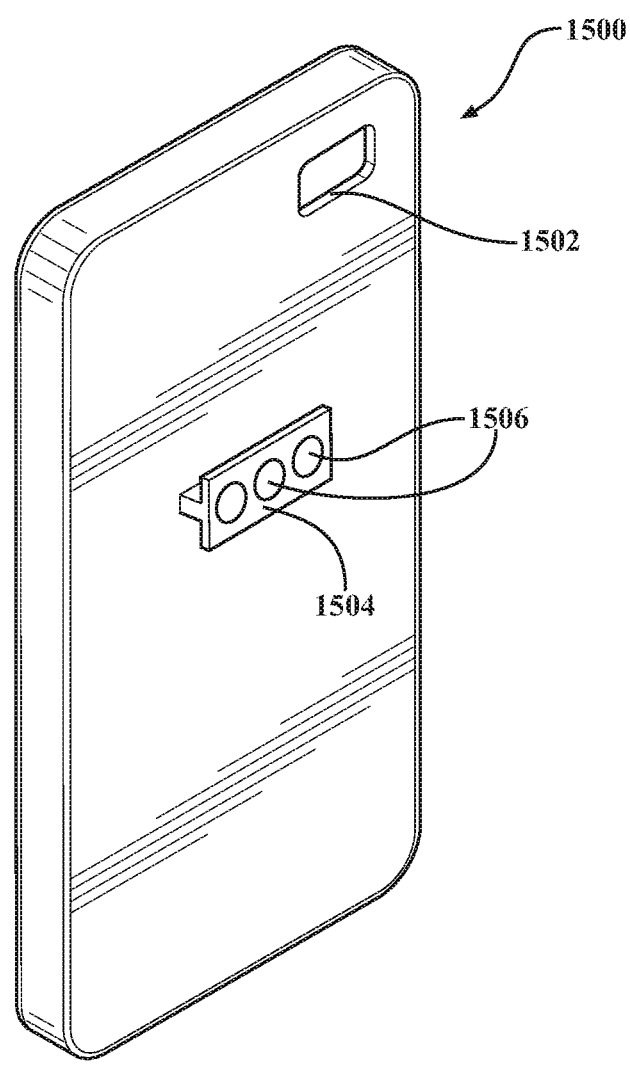
FIG. 15 shows a rear view of a case for use with the mount of FIG. 13.

FIG. 15 shows a rear view of a case 1500 for use with the mount 1300 of FIG. 13. The case 1500 may be shaped to releasably secure, for example, a smart phone, with the smart phone being press fit or otherwise secured within a cavity (not shown) on a front side of the case 1500. The case 1500 may be formed of pliable or substantially pliable materials such as rubber, leather, vinyl, neoprene, etc.

The case 1500 may define an opening 1502 suitable to allow a lens of a camera associated with the smart phone to capture light through the case 1500. The case 1500 may also include a rail 1504 extending substantially perpendicularly from a back of the case 1500, positioned, for example, below the opening 1502 so as to not obscure the opening 1502. The rail 1504 may have a t-shape so as to slide within or be press-fit against the slot 1302 of the mount 1300 of FIG. 13 in order to couple the mount 1300 (and hence the remote imaging device 100 secured by the mount 1300) to the case 1500. In this manner, storage and/or interface of the remote imaging device 100 with a separate or supporting device (such as a smart phone) secured within the case 1500 is possible.

The rail 1504 may include an I/O module 1506 formed of several electronic contact locations suitable to couple the I/O module 1304 of the mount 1300 of FIG. 13. For example, the electronic contact locations of the I/O module 1304 of the mount 1300 may be aligned with the electronic contact locations of the I/O module 1506 of the rail 1504 when the mount 1300 is coupled to the case 1500. When the remote imaging device 100 is electrically coupled to the mount 1300, the mount 1300 is electrically coupled to the case 1500, and a separate or supporting device, such as a smart phone, is electrically coupled to the case 1500, the remote imaging device 100 may thereby be electrically coupled to the separate or supporting device through the mount 1300 and the case 1500. Though the I/O module 1506 of FIG. 15 is shown as including electronic contact locations, other types of I/O modules are also possible.

Figure 16:
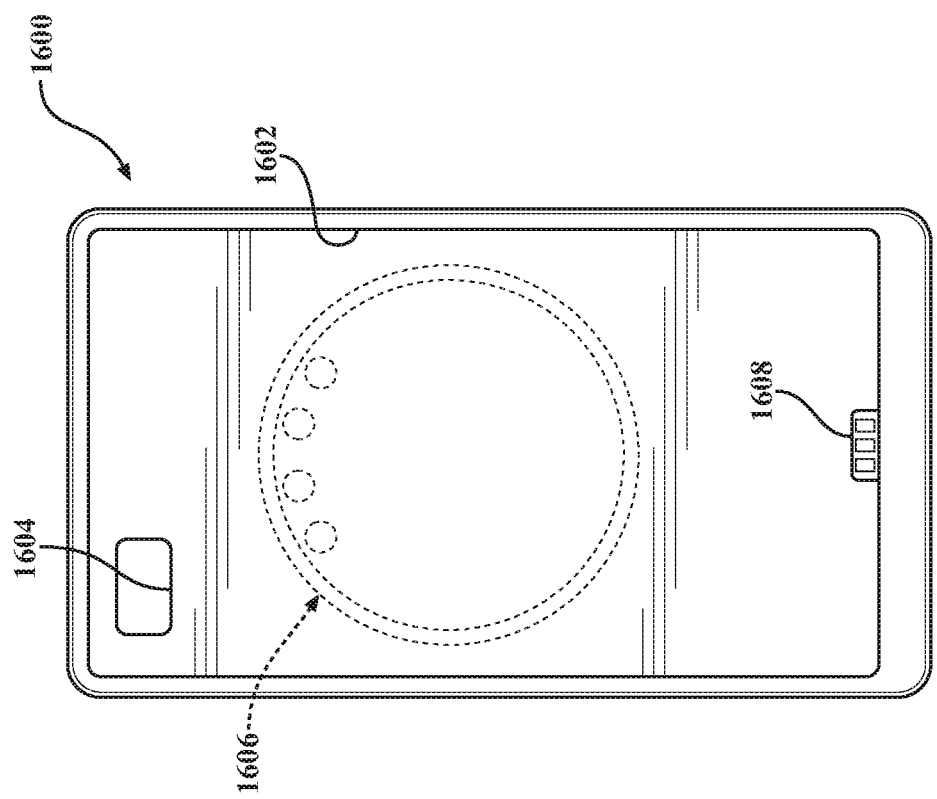
FIG. 16 shows a front view of another case for use with the remote imaging device of FIGS. 1 and 2.

FIG. 16 shows a front view of another case 1600 for use with the remote imaging device 100 of FIGS. 1 and 2. The case 1600 may be shaped to releasably secure, for example, a smart phone, with the smart phone being press fit or otherwise secured within a cavity 1602 formed by side walls of the case 1600. The case 1600 may be formed of pliable or substantially pliable materials such as rubber, leather, vinyl, neoprene, etc. The case 1600 may be configured for use in various environments. For example, the case 1600 may be waterproof and/or include a waterproof enclosure (not shown) that protects the smart phone and/or the remote imaging device 100 from water.

The case 1600 may define an opening 1604 suitable to allow a lens of a camera associated with the smart phone to capture light through the case 1600. The case 1600 may also include a mount 1606 extending perpendicularly from a back of the case 1600, positioned, for example, below the opening 1604 so as to not obscure the opening 1604. Details of the mount 1606 are further described in respect to FIG. 17 below. Other positions for the mount 1606 on the case 1600 are also possible.

The case 1600 may include an I/O module 1608 extending within the cavity 1602 from a bottom surface of the case 1600. The I/O module 1608 may include a communications interface (e.g., USB, HDMI, and/or other interface) configured to electronically couple, for example, a smart phone or other mobile device to the case 1600 and, thereby, to the mount 1606 extending from the back of the case 1600. The I/O module 1608 may provide, for example, supplemental power to the smart phone and/or to the mount 1606 from a power source (e.g., a battery, a DC electrical source, and/or other energy source) disposed within and/or associated with the case 1600. In the example of FIG. 16, the power source may be positioned below the I/O module 1608 within a thick, lower wall of the case 1600.

Figure 17:
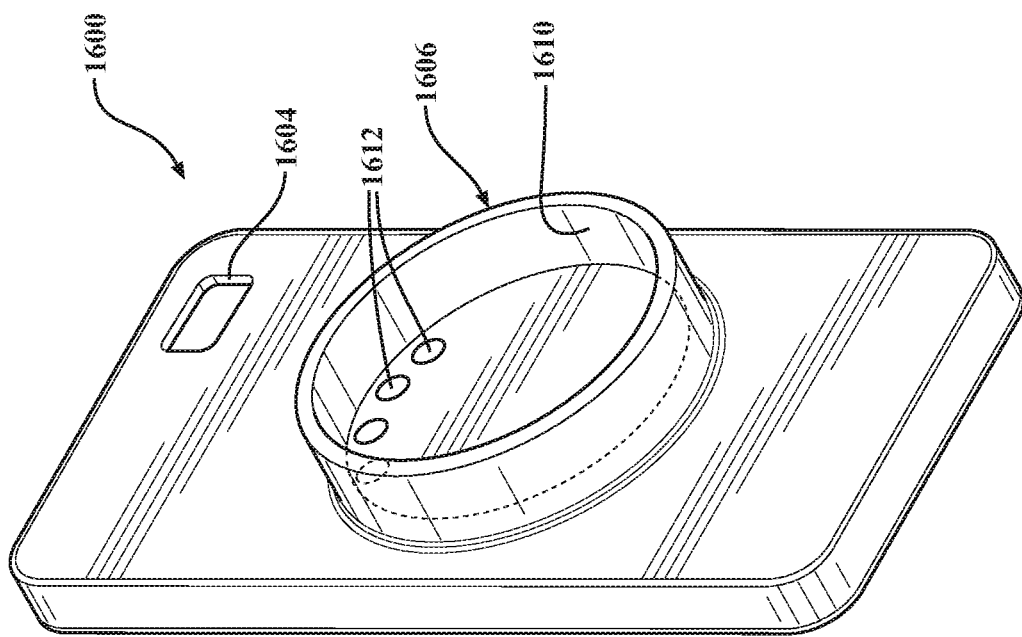
FIG. 17 shows a rear perspective view of the case of FIG. 16.

FIG. 17 shows a rear perspective view of the case 1600 of FIG. 16. The case 1600 includes the centrally-located mount 1606 having a vertically-extending wall 1610 designed to capture sides of the remote imaging device 100, for example, in a flexible, press-fit manner to releasably secure the remote imaging device 100 within the mount 1606. The wall 1610 may be shorter, for example, than the walls 302, 502, 1204 of FIGS. 3, 5, and 12 as the mount 1606 may be inset within the case 1600. The mount 1606 may also include, for example, magnet portions suitable to secure metallic portions of the remote imaging device 100 to the mount 1606.

The mount 1606 may include an I/O module 1612 formed of several electronic contact locations suitable to couple the remote imaging device 100 of FIGS. 1 and 2. For example, the electronic contact locations of the I/O module 200 of the remote imaging device 100 may be aligned and press fit against the electronic contact locations of the I/O module 1612 in the mount 1606 such that the remote imaging device 100 and the case 1600 are electrically coupled when the mount 1606 secures the remote imaging device 100. Though the I/O module 1612 of FIG. 17 is shown as including electronic contact locations, other types of I/O modules for use in an interface to the remote imaging device 100 are also possible.

Figure 18:
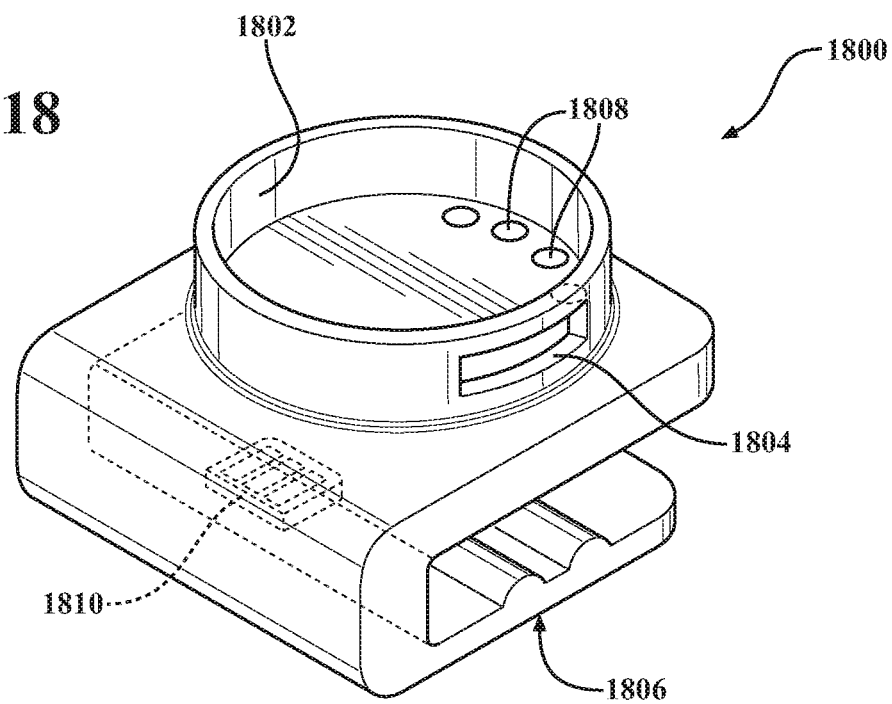
FIG. 18 shows a perspective view of another mount for use with the remote imaging device of FIGS. 1 and 2.

FIG. 18 shows a perspective view of a housing or mount 1800 for use with the remote imaging device 100 of FIGS. 1 and 2. The mount 1800 of FIG. 18 includes a vertically-extending wall 1802 designed to capture sides of the remote imaging device 100, for example, in a flexible, press-fit manner to releasably secure the remote imaging device 100 within the mount 1800. The wall 1802 may form a cavity that receives the remote imaging device 100. The mount 1800 may have a small form factor (e.g., a diameter between 35 mm and 45 mm and a depth between 25 mm and 50 mm)

and may be lightweight as well. The mount 1800 may be formed from semi-rigid materials such as plastic, metal, fiberglass, etc. or more pliable or substantially pliable materials such as leather, vinyl, neoprene, etc.

The wall 1802 of the mount 1800 may define an opening 1804 that allows a user to directly manipulate the control interface 106 of the remote imaging device 100. In another example (not shown), the opening 1804 may be covered with a thin and/or pliable material to allow the user to indirectly manipulate the control interface 106 of the remote imaging device 100. The mount 1800 may be configured for use in various environments. For example, the mount 1800 may itself be waterproof and/or include a waterproof enclosure (not shown) that protects the remote imaging device 100 from water when used, for example, while surfing or scuba diving.

The mount 1800 includes a securing structure 1806 for mechanically coupling the mount to one or more separate or supporting devices such as a smartphone or various other supporting devices described in respect to FIGS. 19-22). In the example of FIG. 18, the securing structure 1806 is a c-shaped channel designed to either clamp around a separate or supporting device or serve as a tab configured to be received in a slot of a supporting device. In other words, the securing structure 1806 has a clamp- or clip-type mechanism used, for example, to slidably and/or compressibly secure the mount 1800 to items such as smart phones, rings, watches, keychains, etc. The securing structure 1806 may include a spring-based hinge, a mechanical clamp, grip-type ridges for increased interference with various surfaces of a supporting device, or any other mechanism suitable to secure the mount 1800 to a separate or supporting device as desired by the user.

The mount 1800 may include a first I/O module 1808 formed of several electronic contact locations suitable to couple the remote imaging device 100 of FIGS. 1 and 2. For example, the electronic contact locations of the I/O module 200 of the remote imaging device 100 may be aligned and press fit against the electronic contact locations of the I/O module 1808 in the mount 1800 such that the remote imaging device 100 and the mount 1800 are electrically coupled when the mount 1800 secures the remote imaging device 100. Though the first I/O module 1808 of FIG. 18 is shown as including electronic contact locations, other types of I/O modules for use in an interface to the remote imaging device 100 are also possible.

The mount 1800 may also include a second I/O module 1810 disposed on and/or within a surface of the securing structure 1806. The I/O module 1810 may include a physical, wired, and/or wireless communications interface (e.g., WiFi, Bluetooth, USB, mini-USB, HDMI, Wireless USB, and/or other interfaces) configured to allow the remote imaging device 100 of FIGS. 1 and 2 to communicate with one or more separate or supporting devices (not shown) when both are secured to the mount 1800. The I/O module 1810 may also include a wired and/or wireless power interface to an external energy source within the separate or supporting device (e.g., a battery, a DC electrical source, and/or other energy sources) that supplies a charge to the imaging unit 102 of the remote imaging device 100 when the remote imaging device 100 and the separate or supporting device are secured to the mount 1800.

In one example, the mount 1800 can releasably capture the remote imaging device 100 of FIGS. 1 and 2 and at the same time be clipped or clamped directly to a separate or supporting device such as a smart phone or a tablet (not shown). In the smart phone example, the first input/output module 1808 of the mount 1800 couples the remote imaging device 100 and the second input/output module 1810 of the mount 1800 couples the smart phone (e.g., using a mini-USB connection). The user may then use the smart phone to operate a software application configured to perform a variety of operations related to camera configuration, image and/or video acquisition, image processing, image display, etc. to interface with the remote imaging device 100. That is, the smart phone can provide control, processing, and display capability to the remote imaging device 100 through use of the mount 1800 as an interface.

For either of the mounts 1600, 1800 described in FIGS. 16, 17, and 18, a wireless connection (e.g., BTLE, WiFi, etc.), may alternatively be used to couple the remote imaging device 100 of FIGS. 1 and 2 and a separate or supporting device such as a smart phone or a tablet. The separate or supporting device may have dedicated memory allocated to the remote imaging device 100, expanding image data storage potential. The separate or supporting device may allow for automatic, wired, and/or wireless offload of image data from the remote imaging device 100 to the separate or supporting device based on recognition of the remote imaging device 100 by the separate or supporting device. The separate or supporting device may allow syncing of image data from the remote imaging device 100 with image data from another imaging device associated with the separate or supporting device (e.g., a camera on the smart phone), for example, to allow a user to capture an event from two different vantage points at the same time: the vantage point of the separate or supporting device and the vantage point of the remote imaging device 100.

Synchronization of image data from the remote imaging device 100 (first source) and from the imaging device associated with the separate or supporting device (second source) may include matching and/or comparing time stamps, correcting for clock drift, and matching and/or comparing location. Using the separate or supporting device to view, manipulate, and/or process the image data for a specific event from both sources may include, for example, docking the remote imaging device 100 in the mount 1606 of the case 1600 and mounting the separate or supporting device within the case 1600. In another example, docking the remote imaging device 100 in the mount 1800 and clamping the mount 1800 to the separate or supporting device allows dual image source processing. The process may also include independently recording image data for the event with both the remote imaging device 100 (first source) and the imaging device associated with the separate or supporting device (second source). The process may also include performing a synchronization on the image data captured by both sources using the separate or supporting device, and then viewing, for example, in split screen or cut-between modes on a display associated with the separate or supporting device, synchronized image data streams from both sources.

In another example, the separate or supporting device may be configured to encode, decode, and/or transfer and share image data captured by the remote imaging device 100. The separate or supporting device may be configured to extract one or more frames of image data from the remote imaging device 100 and format those frames for viewing on a display of the separate device. Other expanded capabilities for storing, processing, and/or otherwise manipulating the image data from the remote imaging device 100 by the separate or supporting device are also possible.

Figure 19:
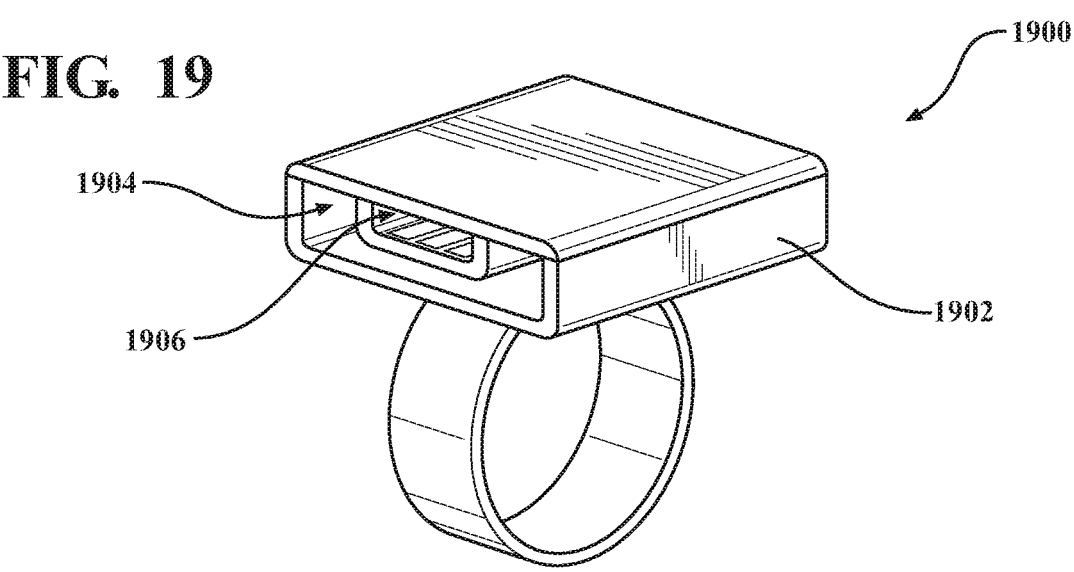
FIG. 19 shows a perspective view of a supporting device for use with the mount of FIG. 18.

FIG. 19 shows a perspective view of a supporting device for use with the mount 1800 of FIG. 18. In the example of FIG. 19, the supporting device is a ring 1900. The ring 1900 includes a housing 1902 extending from and/or along an outer surface of the ring 1900. The housing 1902 defines an opening or a slot 1904. The ring 1900 and the housing 1902 may be of unitary construction or separate construction that is joined in any of a variety of mechanical couplings. The ring 1900 and the housing 1902 may be formed from semi-rigid materials such as plastic, metal, fiberglass, etc. or more pliable or substantially pliable materials such as rubber, leather, vinyl, neoprene, etc.

The ring 1900 may be worn on a finger of a user with the housing 1902 positioned on either an outer surface or a palm of a hand. The housing 1902 and the slot 1904 defined by the housing 1902 may receive the securing structure 1806 of the mount 1800 of FIG. 18. For example, the securing structure 1806 may be slideably engaged within the slot 1904 of the housing 1902 disposed on the ring 1900. By mechanically coupling the securing structure 1806 with the slot 1904 of the housing 1902, the user may carry the remote imaging device 100 on an exterior (or interior) of the hand. In this mounted position, the remote imaging device 100 may be easily positioned based on gestures or other movements of the hand of the user.

An I/O module 1906 may be disposed within the slot 1904 to interface with the second I/O module 1810 disposed on and/or extending from the securing structure 1806 of the mount 1800 in FIG. 18. In the example shown in FIGS. 18 and 19, the second I/O module 1810 of the mount 1800 includes a male member and/or tab and the I/O module 1906 in the housing 1902 of the ring 1900 includes a female member and/or slot. In this manner, the first I/O module 1808 included on the mount 1800 electronically couples the remote imaging device 100 and the second I/O module 1810 on the mount 1800 both mechanically and electronically couples the mount 1800 and the ring 1900.

The ring 1900 may also include an independent power source (not shown) for the remote imaging device 100, a control interface (not shown) that may be manipulated by the user to provide commands to the remote imaging device 100, a storage module (not shown) that may receive and store image data and/or video data from the remote imaging device 100, and/or any other features suitable to provide an interface to the remote imaging device 100 when the ring 1900, the mount 1800, and the remote imaging device 100 are coupled.

Figure 20:
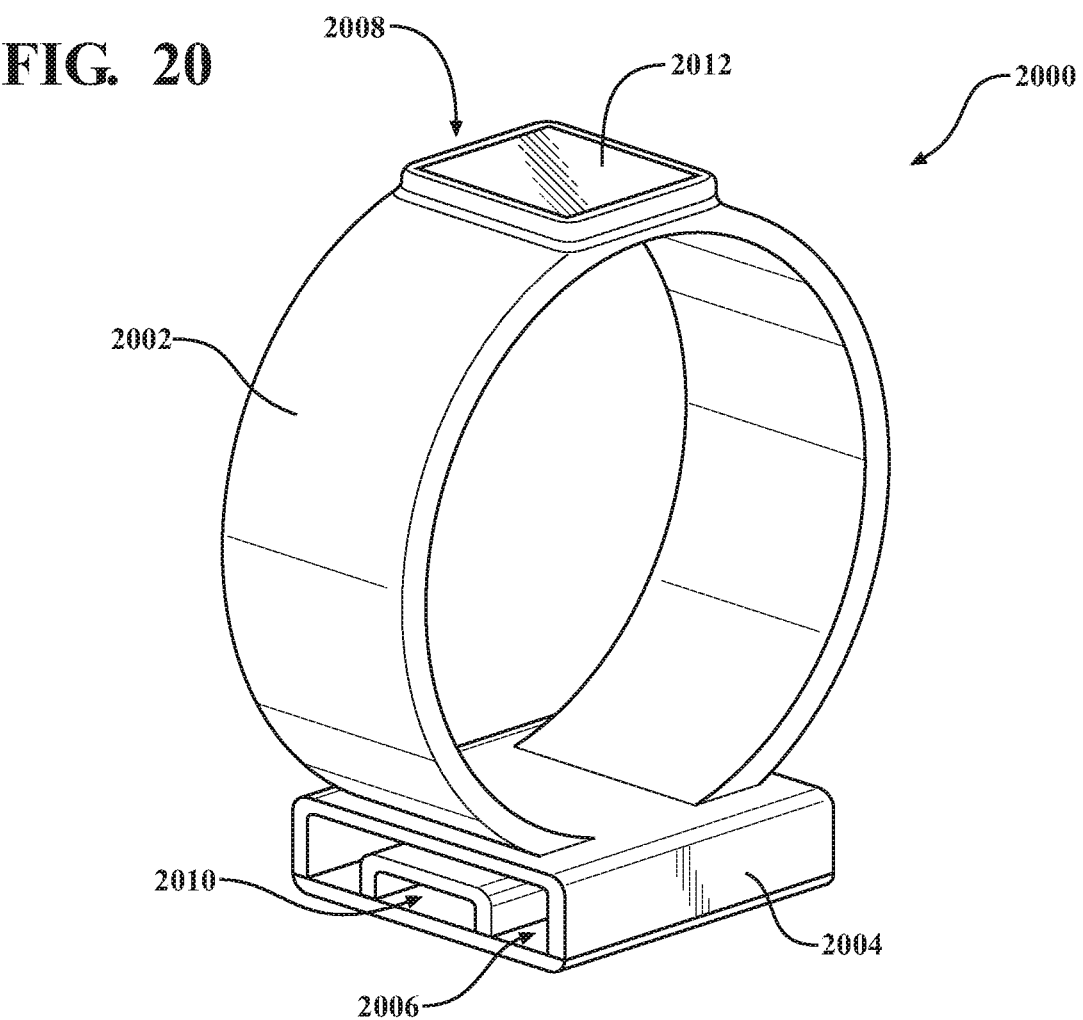
FIG. 20 shows a perspective view of another supporting device for use with the mount of FIG. 18.

FIG. 20 shows a perspective view of a watch 2000 for use with the mount 1800 of FIG. 18. The watch 2000 includes a watch band 2002 extending between a housing 2004 that defines an opening or slot 2006 on one side of the watch 2000 and a display module 2008 configured to provide a date, a time, and/or other display features to a user on another side of the watch 2000. The user can position either the housing 2004 or the display module 2008 on an outer surface of the wrist, and the other of the housing 2004 and the display module 2008 will be located on an inner surface of the wrist when the watch band 2002 is used to fasten the watch 2000 to the wrist. The watch band 2002 can be fastened and/or secured to the wrist of the user in a variety of manners (not shown). The watch band 2002 and the housing 2004 may be formed from semi-rigid materials such as plastic, metal, fiberglass, etc. or more pliable or substantially pliable materials such as rubber, leather, vinyl, neoprene, etc.

The housing 2004 and the slot 2006 defined by the housing 2004 may receive the securing structure 1806 of the mount 1800 of FIG. 18. For example, the securing structure 1806 may be slideably engaged within the slot 2006 of the housing 2004 that forms a portion of the watch 2000. By mechanically coupling the securing structure 1806 with the slot 2006 of the housing 2004, the user may carry the remote imaging device 100 on an exterior (or interior) of the wrist. In this mounted position, the remote imaging device 100 may be easily positioned based on gestures or other movements of an arm of the user.

An I/O module 2010 may be disposed within the slot 2006 to interface with the second I/O module 1810 disposed on and/or extending from the securing structure 1806 of the mount 1800 in FIG. 18. In the example shown in FIGS. 18 and 20, the second I/O module 1810 of the mount 1800 includes a male member and/or tab and the I/O module 2010 in the housing 2004 of the watch 2000 includes a female member and/or slot. In this manner, the first I/O module 1808 included on the mount 1800 electronically couples the remote imaging device 100 and the second I/O module 1810 on the mount 1800 both mechanically and electronically couples the mount 1800 and the watch 2000.

The display module 2008 may include a display screen 2012 and display control logic for adding display functions to the remote imaging device 100 since the remote imaging device 100 does not include a built-in or native display screen. For example, the display module 2008 may digitally display an image of an object currently in a field of view of the lens 104 of the remote imaging device 100 on the display screen 2012. This provides the user with a preview image before capturing images or recording video and allows the user to experience a field of view of the remote imaging device 100 without a native viewfinder. Additionally, the display module 2008 may allow the user to view previously captured and/or stored images or video.

The watch 2000 may also include an independent power source (not shown) for the remote imaging device 100, a control interface (not shown) that may be manipulated by the user to provide commands to the remote imaging device 100 and/or the display module 2008, a storage module (not shown) that may receive and store image data and/or video data from the remote imaging device 100, and/or any other features suitable to provide an interface to the remote imaging device 100 when the watch 2000, the mount 1800, and the remote imaging device 100 are coupled.

Figure 21:
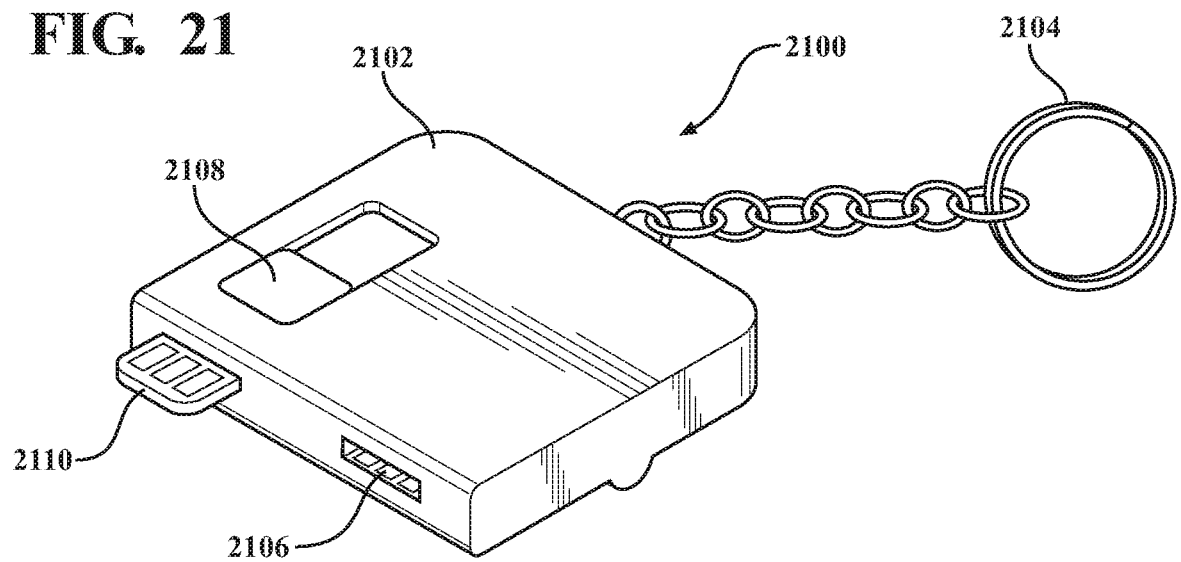
FIG. 21 shows a perspective view of another supporting device for use with the mount of FIG. 18.

FIG. 21 shows a perspective view of a key chain 2100 for use with the mount 1800 of FIG. 18. The key chain 2100 may include an adapter or a fob 2102 coupled to a key ring 2104 that can be used to hold, for example, house keys or car keys. The securing structure 1806 of the mount 1800 of FIG. 18 can be clipped, clamped, and/or slidably engaged around a body of the fob 2102 to mechanically couple the mount 1800 to the key chain 2100 so that the user may carry the mount 1800 and the remote imaging device 100 on the key chain 2100.

The fob 2102 may include a first I/O module 2106 in the form of a female member or slot disposed within an outer surface of the fob 2102. In the example shown in FIGS. 18 and 21, the second I/O module 1810 of the mount 1800 includes a male member and/or tab that engages the female member or slot of the first I/O module 2106 of the fob 2102. In this manner, the first I/O module 1808 included on the mount 1800 electronically couples the remote imaging device 100 and the second I/O module 1810 included on the mount 1800 both mechanically and electronically couples the mount 1800 and the key chain 2100.

The fob 2102 may also include an adjustment mechanism 2108 that allows a second I/O module 2110 present on the key chain 2100 to move in and out of a surface of the fob 2102. In this example, the adjustment mechanism 2108 is a slider mechanism that allows the second I/O module 2110 to extend and retract from a slot within the fob 2102. By retracting the second I/O module 2100 when not in use, connection components of the second I/O module 2110 can be protected during use of the key chain 2100.

The fob 2102 may also include an independent power source (not shown) for the remote imaging device 100, a control interface (not shown) that may be manipulated by the user to provide commands to the remote imaging device 100, a storage module (not shown) that may receive and store image data and/or video data from the remote imaging device 100, and/or any other features suitable to provide an interface to the remote imaging device 100 when the fob 2102, the mount 1800, and the remote imaging device 100 are coupled. The second I/O module 2110 of the fob 2102 may be used to interface with additional separate or supporting devices (not shown), for example, to allow transfer of information between the fob 2102 and the additional separate or supporting devices.

Figure 22:
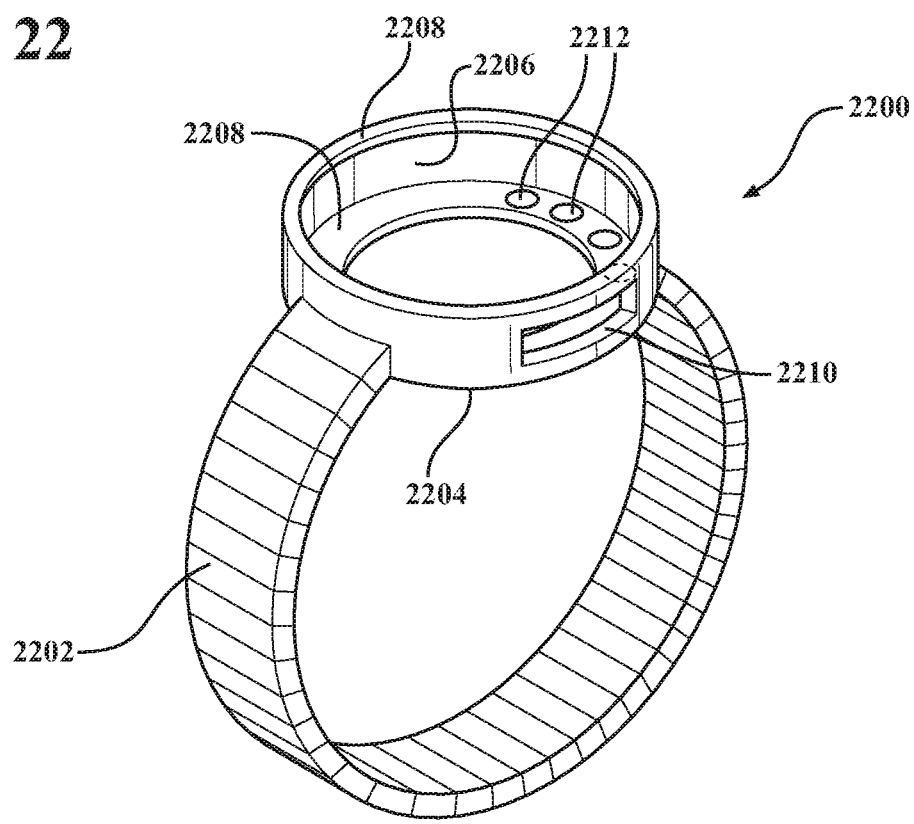
FIG. 22 shows a perspective view of another mount for use with the remote imaging device of FIGS. 1 and 2.

FIG. 22 shows a perspective view of a wristband or bracelet 2200 for use with the remote imaging device 100 of FIGS. 1 and 2. The bracelet 2200 includes a band 2202 for use in securing the bracelet 2200 to a wrist of a user and a housing 2204 that includes a generally cylindrical wall 2206 configured to capture sides of the remote imaging device 100, for example, in a flexible, press-fit manner to releasably secure the remote imaging device 100 within the housing 2204 of the bracelet 2200. The wall 2206 may include retaining lips 2208 that extend from the wall 2206 to form a cavity that receives outer edges of the remote imaging device 100. The retaining lips 2208 may be different widths on opposing ends of the wall 2206. The bracelet 2200 may be formed from pliable or substantially pliable materials such as rubber, leather, vinyl, neoprene, etc.

The wall 2206 of the housing 2204 may define an opening 2210 that allows a user to directly manipulate the control interface 106 of the remote imaging device 100. In another example (not shown), the opening 2210 may be covered with a thin and/or pliable material to allow the user to indirectly manipulate the control interface 106 of the remote imaging device 100. The bracelet 2200 may be configured for use in various environments. For example, the bracelet 2200 may itself be waterproof and/or include a waterproof enclosure (not shown) that protects the remote imaging device 100 from water when used, for example, while surfing or scuba diving.

Either the wall 2206 or one of the retaining lips 2208 may include an I/O module 2212 formed of several electronic contact locations suitable to couple the remote imaging device 100 of FIGS. 1 and 2. For example, the electronic contact locations of the I/O module 200 of the remote imaging device 100 may be aligned and press fit against the electronic contact locations of the I/O module 2212 on the lower retaining lip 2208 of the housing 2204 of the bracelet 2200 such that the remote imaging device 100 and the bracelet 2220 are electrically coupled when the bracelet 2200 secures the remote imaging device 100. Though the I/O module 2212 of FIG. 22 is shown as including electronic contact locations, other types of I/O modules for use in an interface to the remote imaging device 100 are also possible.

Figure 23:
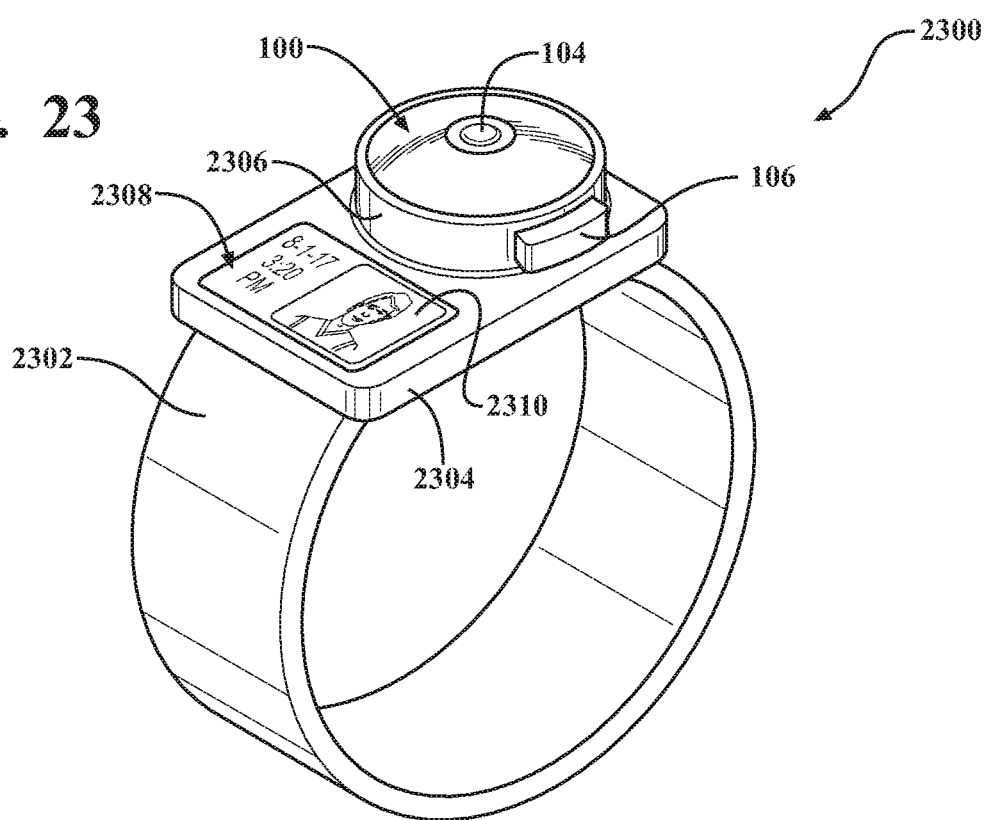
FIG. 23 shows a perspective view of another mount for use with the remote imaging device of FIGS. 1 and 2.

FIG. 23 shows a perspective view of another watch 2300 for use with the remote imaging device 100 of FIGS. 1 and 2. The watch 2300 includes a watch band 2302 extending from two sides of a housing 2304. The watch band 2302 can be fastened and/or secured to a wrist of a user in a variety of ways. The watch band 2302 and the housing 2304 may be formed from semi-rigid materials such as plastic, metal, fiberglass, etc. or more pliable or substantially pliable materials such as rubber, leather, vinyl, neoprene, etc.

The housing 2304 may include a vertically-extending wall 2306 designed to capture sides of the remote imaging device 100, for example, in a flexible, press-fit manner to releasably secure the remote imaging device 100 within the housing 2304. The wall 2306 may form a cavity that receives the remote imaging device 100. The wall 2306 may also define an opening (not shown) that allows a user to directly manipulate the control interface 106 of the remote imaging device 100. The watch 2300 may be configured for use in various environments. For example, the watch 2300 may be waterproof and/or include a waterproof enclosure (not shown) that protects the remote imaging device 100 from water when used, for example, while surfing or scuba diving.

The housing 2304 may include and/or support a display module 2308 configured to provide a date, a time, and/or other display features to a user of the watch 2300. The display module 2308 may include a display screen 2310 and display control logic for adding display functions to the remote imaging device 100 since the remote imaging device 100 does not include a built-in or native display screen. In the example of FIG. 23, the display screen 2310 includes an image of an object currently in a field of view of the lens 104 of the remote imaging device 100 (here, a person) as well as a time, "3:20 PM," and a date "8-1." The display module 2308 can thus provide the user time and date information, previews of objects within a field of view of the remote imaging device 100, and recorded or captured images or video previously captured by the remote imaging device 100.

The watch 2300 may also include an independent power source (not shown) for the remote imaging device 100, a control interface (not shown) that may be manipulated by the user to provide commands to the remote imaging device 100 and/or the display module 2308, a storage module (not shown) that may receive and store image data and/or video data from the remote imaging device 100, and/or any other features suitable to provide an interface to the remote imaging device 100 and/or the display module 2308 when the watch 2300 and the remote imaging device 100 are coupled.

Figure 24:
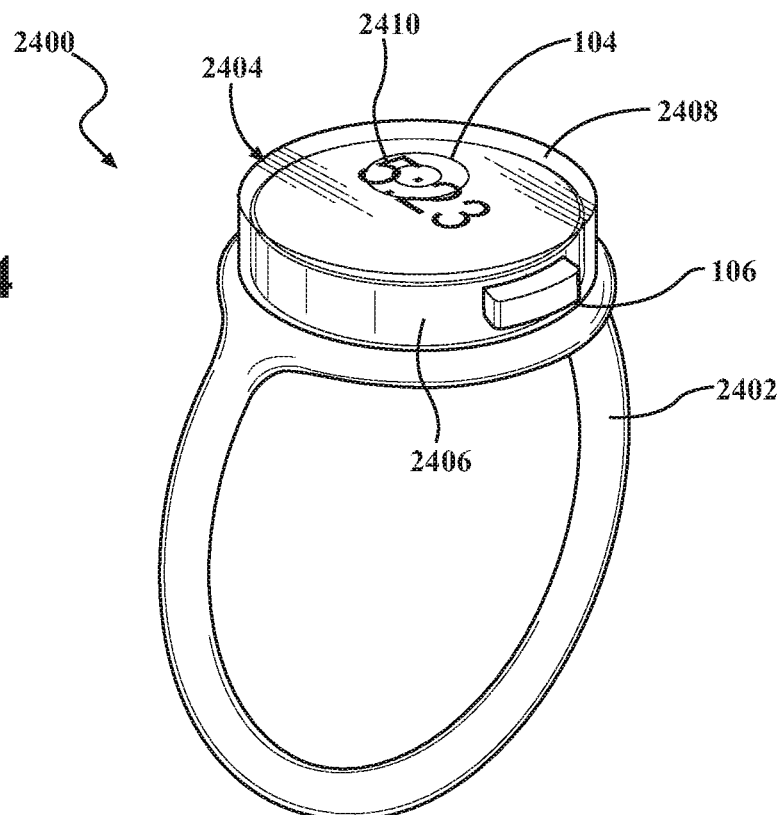
FIG. 24 shows a perspective view of another mount for use with the remote imaging device 100 of FIGS. 1 and 2.

FIG. 24 shows a perspective view of another watch 2400 for use with the remote imaging device 100 of FIGS. 1 and 2. The watch 2400 includes a watch band 2402 extending from two sides of a housing 2404. The watch band 2402 can be fastened and/or secured to a wrist of a user in a variety of ways. The watch band 2402 and the housing 2404 may be formed from semi-rigid materials such as plastic, metal, fiberglass, etc. or more pliable or substantially pliable materials such as rubber, leather, vinyl, neoprene, etc.

The housing 2404 may include a vertically-extending wall 2406 designed to capture sides of the remote imaging device 100, for example, in a flexible, press-fit manner to releasably secure the remote imaging device 100 within the housing 2404. The wall 2406 may define an opening (not shown) that allows a user to directly manipulate the control interface 106 of the remote imaging device 100. The housing 2404 may also include a cover 2408 that extends along and across an upper surface of the wall 2406, the cover 2408 being designed to obscure, seal, restrain, and/or otherwise engage a top or outer surface of the remote imaging device 100, depending on a configuration or mode of use of the watch 2400 as further described below.

The cover 2408 may include or support a display module 2410 configured to provide a date, a time, and/or other display features to a user of the watch 2400. In the example of FIG. 24, the display module 2410 is currently being used to display a time, "5:23," in a manner that at least partially obscures the lens 104 of the remote imaging device 100 from view. In another embodiment (not shown), the display module 2410 may be inactivated or otherwise controlled such that the cover 2408 becomes clear, or mostly permeable to light, allowing full function of the lens 104 of the remote imaging device 100.

The display module 2410 may also include display control logic for adding display functions to the remote imaging device 100 since the remote imaging device 100 does not include a built-in or native display screen. For example, the display module 2410 may digitally display previously captured and/or stored images or video associated with the remote imaging device 100 based on user input, for example, using the control interface 106.

The watch 2400 may be configured for use in various environments. For example, the watch 2400 may be waterproof and/or the wall 2406 and the cover 2408 may be waterproof and designed to protect the remote imaging device 100 from water when used, for example, while surfing or scuba diving.

The watch 2400 may also include an independent power source (not shown) for the remote imaging device 100, a control interface (not shown) that may be manipulated by the user to provide commands to the display module 2410, a storage module (not shown) that may receive and store image data and/or video data from the remote imaging device 100, and/or any other features suitable to provide an interface to the remote imaging device 100 and/or the display module 2410 when the watch 2400 and the remote imaging device 100 are coupled.

Figure 25:
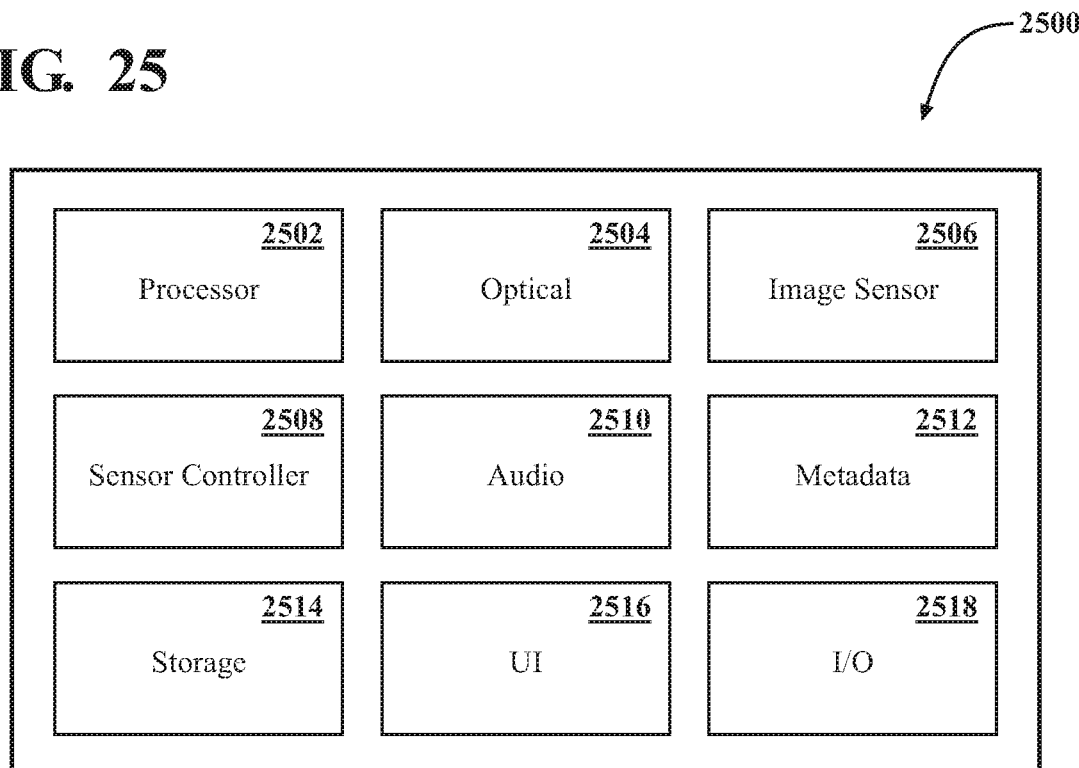
FIG. 25 is a functional block diagram illustrating electronic components used for operation of and interface with a remote imaging device.

FIG. 25 is a functional block diagram illustrating components of an imaging device 2500. The imaging device 2500 of FIG. 25 may include or interface with a camera configured to capture photo, video, and/or audio content such as the remote imaging device 100 of FIGS. 1-2. The imaging device 2500 may include one or more processors 2502 (such as a system on a chip (SOC), microcontroller, microprocessor, CPU, DSP, ASIC, GPU, and/or other processors) that control the operation and functionality of the imaging device 2500.

The imaging device 2500 may include one or more optical elements 2504, such as one or more lenses. The one or more lenses may include, by way of non-limiting example, one or more of a standard lens, macro lens, zoom lens, special-purpose lens, telephoto lens, prime lens, achromatic lens, apochromatic lens, process lens, wide-angle lens, ultra-wide-angle lens, fisheye lens, infrared lens, ultraviolet lens, perspective control lens, other lens, and/or other optical element. In some implementations, the optical elements 2504 may implement focus controller functionality configured to control the operation and configuration of the one or more lenses.

The imaging device 2500 may include at least one image sensor 2506, such as one or more of a charge-coupled device (CCD) sensor, active pixel sensor (APS), complementary metal-oxide semiconductor (CMOS) sensor, N-type metal-oxide-semiconductor (NMOS) sensor, and/or other image sensor. The image sensor 2506 may be configured to capture light waves gathered by the optical elements 2504 and to produce image data based on control signals from a sensor controller 2508. The image sensor 2506 may be configured to generate a first output signal conveying first visual information regarding the object. The visual information may include one or more of an image, a video, and/or other visual information. In some implementations, the image sensor 2506 may include, without limitation, video, audio, capacitive, radio, vibrational, ultrasonic, infrared, radar, LIDAR and/or sonar, and/or other sensory devices. The optical elements 2504 and the one or more image sensors 2506 may be embodied in a housing.

The imaging device 2500 may include the aforementioned sensor controller 2508. The sensor controller 2508 may be used to operate the image sensor 2506. The sensor controller 2508 may receive image or video input from the image sensor 2506 and audio information from one or more audio components 2510, such as from microphones configured to provide audio information that may be associated with images being acquired by the image sensor 2506 or voice-based commands being provided by a user. In some implementations, audio information may be encoded using, e.g., AAC, AC3, MP3, linear PCM, MPEG-H, and/or other audio coding formats (audio codec). In one or more implementations of spherical video and/or audio, the audio codec may include a 3-dimensional audio codec.

The imaging device 2500 may include one or more metadata sources 2512 embodied within a housing and/or disposed externally to the imaging device 2500. The processor 2502 may interface to the sensor controller 2508 and/or the one or more metadata sources 2512. The metadata sources 2512 may include sensors such as an inertial measurement unit (IMU) including one or more accelerometers and/or gyroscopes, a magnetometer, a compass, a global positioning system (GPS) sensor, an altimeter, an ambient light sensor, a temperature sensor, a pressure sensor, a heart rate sensor, and/or other sensors. The imaging device 2500 may contain one or more other metadata/telemetry sources, e.g., a battery monitor, storage parameters, and/or other information related to camera operation and/or capture of content. The metadata sources 2512 may obtain information related to an environment of the imaging device 2500 and aspects in which the content is captured.

By way of a non-limiting example, the accelerometer may provide device motion information comprising velocity and/or acceleration vectors representative of motion of the imaging device 2500; the gyroscope may provide orientation information describing the orientation of the imaging device 2500; the GPS sensor may provide GPS coordinates, time, and identifying location of the imaging device 2500; and the altimeter may obtain the altitude of the imaging device 2500. In some implementations, the metadata sources 2512 may be rigidly coupled to the imaging device 2500 such that any motion, orientation, or change in location experienced by the imaging device 2500 is also experienced by the metadata sources 2512.

The sensor controller 2508 and/or the processor 2502 may be operable to synchronize various types of information received from the metadata sources 2512. For example, timing information may be associated with the sensor data. Using the timing information, metadata information may be related to content (photo/video) captured by the image sensor 2506. In some implementations, the metadata capture may be decoupled from video/image capture. That is, metadata may be stored before, after, and in-between one or more video clips and/or images. In one or more implementations, the sensor controller 2508 and/or the processor 2502 may perform operations on the received metadata to generate additional metadata information. For example, the sensor controller 2508 may integrate the received acceleration information to determine the velocity profile of the imaging device 2500 during the recording of a video. In some implementations, video information may consist of multiple frames of pixels using any applicable encoding method (e.g., H.262, H.264, Cineform, and/or other codec).

The imaging device 2500 may include an electronic storage 2514. The electronic storage 2514 may include a system memory module that is configured to store executable computer instructions that, when executed by the processor 2502, perform various functionalities including those described herein. The electronic storage 2514 may include a storage memory configured to store content (e.g., metadata, images, audio) captured by the imaging device 2500. The electronic storage 2514 may also be located external to the imaging device 2500.

The electronic storage 2514 may include non-transitory memory configured to store configuration information and/or processing code configured to enable, e.g., video information and metadata capture, and/or to produce a multimedia stream comprised of, e.g., a video track and metadata in accordance with the methodologies of the present disclosure. In one or more implementations, the processing configuration may include capture type (e.g., video, still images), image resolution, frame rate, burst setting, white balance, recording configuration (e.g., loop mode), audio track configuration, and/or other parameters that may be associated with audio, video, and/or metadata capture. Additional memory may be available for other hardware/firmware/software needs of the imaging device 2500. The processor 2502 may interface to the sensor controller 2508 in order to obtain and process sensory information for, e.g., object detection, face tracking, stereo vision, and/or other tasks.

The imaging device 2500 may interface with a user interface (UI) device 2516. The UI device 2516 may include virtually any type of device capable of registering inputs from and/or communicating outputs to a user. These may include, without limitation, display, touch, proximity sensitive interface, light, sound receiving/emitting devices, wired/wireless input devices, and/or other devices. In some implementations, the UI device 2516 may correspond to a smartphone, a tablet computer, a phablet, a smart watch, a portable computer, and/or another device configured to receive user input and communicate information with the imaging device 2500. In some implementations, the imaging device 2500 may be configured to provide image or video content (or a portion thereof) to the UI device 2516 for processing and/or viewing.

The UI device 2516 may operate a software application configured to perform a variety of operations related to camera configuration, control of video acquisition, image processing, and/or display of video captured by the imaging device 2500. An application (e.g., GoPro App) may enable a user to create short video clips and share video clips to a cloud service (e.g., Instagram, Facebook, YouTube, Dropbox); perform full remote control of functions of the imaging device 2500; live preview video being captured for shot framing; mark key moments while recording (e.g., HiLight Tag); View HiLight Tags in GoPro Camera Roll for location and/or playback of video highlights; wirelessly control camera software; and/or perform other functions. Various methodologies may be utilized for configuring the imaging device 2500 and/or processing or displaying the captured information from the imaging device 2500. Image data transfer and/or stop/start for image capture may be controlled using any of the UI functionalities described, for example, in respect to the control interface 106 of the remote imaging device 100.

By way of an illustration, the UI device 2516 may receive a user setting characterizing image resolution (e.g., 3840 pixels by 2160 pixels), frame rate (e.g., 60 frames per second (fps)), and/or other settings (e.g., location) related to the activity (e.g., mountain biking) being captured by the user with the imaging device 2500. The UI device 2516 may then communicate these settings to the imaging device 2500.

A display (not shown) of the UI device 2516 may act as a viewport into content captured by the imaging device 2500. In some implementations, the UI device 2516 may communicate additional information (e.g., metadata) to the imaging device 2500. By way of an illustration, the UI device 2516 may provide orientation of the UI device 2516 with respect to a given coordinate system to the imaging device 2500 so as to enable determination of an orientation and/or dimensions for viewing a portion of the captured content provided by the imaging device 2500.

The display associated with the UI device 2516 may be configured to provide information related to camera operation mode (e.g., image resolution, frame rate, capture mode, sensor mode, video mode, photo mode), connection status (e.g., connected, wireless, wired connection), power mode (e.g., standby, sensor mode, video mode, battery status), information related to metadata sources (e.g., heart rate, GPS), and/or other information.

The UI device 2516 may also include one or more UI interface components, such as the control interface 106 of FIGS. 1 and 2, configured to enable the user to start, stop, pause, and/or resume sensor and/or content capture. User commands may be encoded using a variety of approaches including a duration of button press (pulse width modulation), a number of button presses (pulse code modulation), and/or a combination thereof. For example, two short button presses may initiate sensor acquisition mode and a single short button press may be used to communicate (i) initiation of video and/or photo capture and cessation of video and/or photo capture (e.g., toggle mode) or (ii) video and/or photo capture for a given time duration or number of frames (e.g., burst capture). Other user command or communication implementations may also be realized, e.g., short/long button press combinations.

The imaging device may include an I/O module 2518. The I/O module 2518 may be configured to synchronize the imaging device 2500 with other cameras and/or with other external devices, such as a remote control, a second capture device, a smartphone, and/or a video server. The I/O module 2518 may be configured to communicate information to/from various I/O components. In some implementations, the I/O module 2518 may include a wired and/or wireless communications interface (e.g., WiFi, Bluetooth, USB, HDMI, Wireless USB, Near Field Communication (NFC), Ethernet, a radio frequency transceiver, and/or other interfaces) configured to communicate to one or more external devices (e.g., UI device 2516 and/or another metadata source). In some implementations, the I/O module 2518 may interface with LED lights, a display, a button, a microphone, speakers, and/or other I/O components. In one or more implementations, the I/O module 2518 may interface to an energy source, e.g., a battery and/or a DC electrical source.

The I/O module 2518 of the imaging device 2500 may include one or more connections to external computerized devices to allow for configuration and/or management of either the imaging device 2500 or various remote devices. The I/O module 2518 may include any of the wireless or wireline interfaces discussed above, and further, may include customized or proprietary connections for specific applications. In some implementations, the I/O module 2518 may comprise a component (e.g., a dongle) comprising an infrared sensor, a radio frequency antenna, an ultrasonic transducer, and/or other communications interfaces. In one or more implementations, the I/O module 2518 may include a local (e.g., Bluetooth, Wi-Fi) and/or broad range (e.g., cellular LTE) communications interface configured to enable communications between the imaging device 2500 and a remote device such as the UI device 2516 described above.

The imaging device 2500 may include a power system (not shown) that may be tailored to the needs of the imaging device 2500. For example, a small-sized, lower-power action camera may include a wireless power solution, a removable/replaceable battery, a solar cell, an inductive (contactless) power source, rectification, and/or other power supplies.

Where certain elements of these implementations may be partially or fully implemented using known components, only those portions of such known components that are necessary for an understanding of the present disclosure have been described, and detailed descriptions of other portions of such known components have been omitted so as not to obscure the disclosure.

In the present specification, an implementation showing a singular component should not be considered limiting; rather, the disclosure is intended to encompass other implementations including a plurality of the same component, and vice-versa, unless explicitly stated otherwise herein.

Further, the present disclosure encompasses present and future known equivalents to the components referred to herein by way of illustration.

As used herein, the term "bus" is meant generally to denote all types of interconnection or communication architecture that may be used to communicate data between two or more entities. The "bus" could be optical, wireless, infrared or another type of communication medium. The exact topology of the bus could be for example standard "bus", hierarchical bus, network-on-chip, address-event-representation (AER) connection, or other type of communication topology used for accessing, e.g., different memories in a system.

As used herein, the terms "computer," "computing device," and "computerized device" include, but are not limited to, personal computers (PCs) and minicomputers, whether desktop, laptop, or otherwise, mainframe computers, workstations, servers, personal digital assistants (PDAs), handheld computers, embedded computers, programmable logic device, personal communicators, tablet computers, portable navigation aids, J2ME equipped devices, cellular telephones, smart phones, personal integrated communication or entertainment devices, or literally any other device capable of executing a set of instructions.

As used herein, the term "computer program" or "software" is meant to include any sequence or human or machine cognizable steps which perform a function. Such program may be rendered in virtually any programming language or environment including, for example, C/C++, C#, Fortran, COBOL, MATLAB™, PASCAL, Python, assembly language, markup languages (e.g., HTML, SGML, XML, VoXML), and the like, as well as object-oriented environments such as the Common Object Request Broker Architecture (CORBA), Java™ (including J2ME, Java Beans), Binary Runtime Environment (e.g., BREW), and the like.

As used herein, the terms "connection," "link," "transmission channel," "delay line," and "wireless" mean a causal link between any two or more entities (whether physical or logical/virtual) which enables information exchange between the entities.

As used herein, the terms "integrated circuit," "chip," and "IC" are meant to refer to an electronic circuit manufactured by the patterned diffusion of trace elements into the surface of a thin substrate of semiconductor material. By way of non-limiting example, integrated circuits may include field programmable gate arrays (e.g., FPGAs), a programmable logic device (PLD), reconfigurable computer fabrics (RCFs), systems on a chip (SoC), application-specific integrated circuits (ASICs), and/or other types of integrated circuits.

As used herein, the term "memory" includes any type of integrated circuit or other storage device adapted for storing digital data including, without limitation, ROM, PROM, EEPROM, DRAM, Mobile DRAM, SDRAM, DDR/2 SDRAM, EDO/FPMS, RLDRAM, SRAM, "flash" memory (e.g., NAND/NOR), memristor memory, and PSRAM.

As used herein, the terms "microprocessor" and "digital processor" are meant generally to include digital processing devices. By way of non-limiting example, digital processing devices may include one or more of digital signal processors (DSPs), reduced instruction set computers (RISC), general-purpose (CISC) processors, microprocessors, gate arrays (e.g., field programmable gate arrays (FPGAs)), PLDs, reconfigurable computer fabrics (RCFs), array processors, secure microprocessors, application-specific integrated circuits (ASICs), and/or other digital processing devices. Such digital processors may be contained on a single unitary IC die, or distributed across multiple components.

As used herein, the term "network interface" refers to any signal, data, and/or software interface with a component, network, and/or process. By way of non-limiting example, a network interface may include one or more of FireWire (e.g., FW400, FW110, and/or other variation.), USB (e.g., USB2), Ethernet (e.g., 10/100, 10/100/1000 (Gigabit Ethernet), 10-Gig-E, and/or other Ethernet implementations), MoCA, Coaxsys (e.g., TVnet™), radio frequency tuner (e.g., in-band or 00B, cable modem, and/or other protocol), Wi-Fi (802.11), WiMAX (802.16), PAN (e.g., 802.15), cellular (e.g., 3G, LTE/LTE-A/TD-LTE, GSM, and/or other cellular technology), IrDA families, and/or other network interfaces.

As used herein, the term "Wi-Fi" includes one or more of IEEE-Std. 802.11, variants of IEEE-Std. 802.11, standards related to IEEE-Std. 802.11 (e.g., 802.11 a/b/g/n/s/v), and/or other wireless standards.

As used herein, the term "wireless" means any wireless signal, data, communication, and/or other wireless interface. By way of non-limiting example, a wireless interface may include one or more of Wi-Fi, Bluetooth, 3G (3GPP/3GPP2), HSDPA/HSUPA, TDMA, CDMA (e.g., IS-95A, WCDMA, and/or other wireless technology), FHSS, DSSS, GSM, PAN/802.15, WiMAX (802.16), 802.20, narrowband/FDMA, OFDM, PCS/DCS, LTE/LTE-A/TD-LTE, analog cellular, CDPD, satellite systems, millimeter wave or microwave systems, acoustic, infrared (i.e., IrDA), and/or other wireless interfaces.

As used herein, the term "robot" may be used to describe an autonomous device, autonomous vehicle, computer, artificial intelligence (AI) agent, surveillance system or device, control system or device, and/or other computerized device capable of autonomous operation.

As used herein, the term "camera" may be used to refer to any imaging device or sensor configured to capture, record, and/or convey still and/or video imagery which may be sensitive to visible parts of the electromagnetic spectrum, invisible parts of the electromagnetic spectrum (e.g., infrared, ultraviolet), and/or other energy (e.g., pressure waves).

While certain aspects of the technology are described in terms of a specific sequence of steps of a method, these descriptions are only illustrative of the broader methods of the disclosure and may be modified as required by the particular application. Certain steps may be rendered unnecessary or optional under certain circumstances. Additionally, certain steps or functionality may be added to the disclosed implementations, or the order of performance of two or more steps permuted. All such variations are considered to be encompassed within the disclosure.

While the above detailed description has shown, described, and pointed out novel features of the disclosure as applied to various implementations, it will be understood that various omissions, substitutions, and changes in the form and details of the devices or processes illustrated may be made by those skilled in the art without departing from the disclosure. The foregoing description is in no way meant to be limiting, but rather should be taken as illustrative of the general principles of the technologies.

EMBODIMENTS

The present disclosure describes a system comprising an imaging device, comprising: an imaging unit with a lens that focuses light onto an image sensor that produces image data, wherein the image data is only stored by the imaging device for transfer to and processing by an external device; and a control interface that provides commands to the imaging unit; and a mount, comprising: walls that releasably secure the imaging device and provide access to the control interface; and a securing structure that secures the mount to a variety of locations.

In the system, the imaging device and the mount may each comprise an input/output module to electronically couple the imaging device and the mount when the input/output modules are coupled. The mount may comprise another input/output module to electronically couple the imaging device to the external device.

In the system, the securing structure may define a slot that slidably and compressibly secures the mount to the variety of locations. The securing structure may comprise a magnetic structure and a metallic structure attractable to the magnetic structure to magnetically secure the mount to the variety of locations. The securing structure may comprise a plurality of protrusions extending from an outer surface of the mount, each protrusion comprising an opening.

In the system, the mount may comprise a housing having a first housing portion and a second housing portion, the second housing portion being securable to the first housing portion with another securing structure. The imaging device may comprise an input/output module, and the second housing portion may comprise another input/output module that electronically couples the input/output module of the imaging device when the second housing portion is secured to the first housing portion in contact with imaging device. The second housing portion may comprise a display module having a display screen that digitally displays an image of an object currently in a field of view of the lens of the remote imaging device on the display screen when the input/output modules of the imaging device and the second housing portion are electronically coupled.

The present disclosure also describes a system, comprising: a mount, comprising: a wall that releasably secures an imaging device; a first input/output module that electronically couples the mount to the imaging device; and a second input/out module that electronically couples the mount to a supporting device, wherein the supporting device is at least one of a smart phone, a watch, a ring, a bracelet, or a keychain.

In the system, the wall may define an opening that provides access to a control interface of the imaging device. The wall may comprise a magnetic structure that magnetically secures the imaging device to the mount. The mount may comprise a securing structure that mechanically couples the mount to the supporting device. The mount may comprise a tab and the supporting device may comprise a slot slideably receiving the tab when the mount is mechanically coupled to the supporting device.

In the system, the imaging device may comprise an imaging unit with a lens that focuses light onto an image sensor that produces image data, wherein the image data is only stored by the imaging device for transfer to and processing by an external device. In the system, the external device may be the supporting device.

The present disclosure also describes a wearable device, comprising: a mount, comprising: a wall that releasably secures an imaging device; an input/output module that electronically couples the imaging device to the mount; and a display module comprising a display screen that displays an image of an object currently in a field of view of a lens of the imaging device in an image capture configuration.

In the wearable device, the display screen may display at least one of a time, a date, or a timer in a watch configuration. The display screen of the display module may cover the lens of the imaging device when the imaging device is releasably secured within the wall. The display screen of the display module may be spaced from the wall that releasably secures the imaging device.

What is claimed is:

1. A system, comprising:
    an imaging device, comprising:
        an imaging unit with a lens that focuses light onto an image sensor that produces image data, wherein the image data is stored by the imaging device for transfer to and processing by an external device;
        a first input/output module comprising an electronic contact location, wherein the electronic contact location is generally planar and extends along an exterior surface of the imaging device;
        an indicator configured to emit different patterns of beeps or buzzes to represent different modes, power states, or connection statuses of the imaging device; and
        a control interface that provides commands to the imaging unit; and
    a housing, comprising:
        a cavity within which sides of the imaging device are releasably secured without restricting access to the control interface of the imaging device; and
        a cover configured to enclose the cavity and display at least one of a time, a date, or the image data in a manner that at least partially obscures the lens of the imaging device.

2. The system of claim 1, wherein the housing includes a second input/output module comprising an electronic contact location that is generally planar, extends along an exterior surface of the housing, and is configured to electronically couple to the electronic contact location of the first input/output module based on alignment and press-fit of the electronic contact locations.

3. The system of claim 2, wherein the housing includes a power source configured to supply a charge to the imaging device in response to electronically coupling the first input/output module and the second input/output module.

4. The system of claim 2, wherein the housing is configured to communicate with the external device.

5. The system of claim 4, wherein the housing is configured to transfer the image data to the external device in response to electronically coupling the first input/output module and the second input/output module.

6. The system of claim 1, wherein the housing defines an opening providing access to the control interface.

7. The system of claim 1, wherein the housing includes a pliable material providing indirect access to the control interface.

8. The system of claim 1, comprising a mount including a magnet configured to secure the housing or the imaging device to the mount.

9. The system of claim 1, wherein the housing includes at least one of a band or a chain configured to be releasably secured to a user.

10. The system of claim 9, wherein the housing includes the band extending between two sides of the housing, and wherein the band is configured to be worn on a finger of a user.

11. The system of claim 1, wherein the cover is configured become at least partially permeable to light to allow full function of the lens.

12. A housing for an imaging device, comprising:
walls defining a cavity configured to receive and releasably secure the imaging device within the housing such that access to a lens of the imaging device is unrestricted;
an input/output module configured to couple to an input/output module of the imaging device when the imaging device is secured within the housing; and
a cover configured to enclose the imaging device within the cavity, the cover including a display configured to:
display at least one of a time or a date such that the displayed time or the displayed date at least partially obscures a lens of the imaging device; and
become at least partially permeable to light to allow full function of the lens,
wherein the housing is configured to supply a charge to the imaging device based on coupling the input/output module of the housing and the input/output module of the imaging device.

13. The housing of claim 12, wherein the housing defines an opening providing access to a control interface of the imaging device.

14. The housing of claim 12, wherein the housing includes a pliable material providing indirect access to a control interface of the imaging device.

15. The housing of claim 12, wherein the housing further comprises a band extending between two sides of the housing, and wherein the band is configured to be worn on a finger or wrist of a user to secure the housing to the user.

16. The housing of claim 12, wherein the housing includes a power source configured to supply the charge to the imaging device in response to coupling the input/output module of the housing to the input/output module of the imaging device.

17. The housing of claim 12, wherein the input/output module of the housing comprises an electronic contact location, and wherein the input/output module of the image device comprises another electronic contact location disposed on an exterior surface of the imaging device.

18. An imaging device, comprising:
an imaging unit with a lens that focuses light onto an image sensor that produces image data, wherein the image data is only stored by the imaging device for transfer to and processing by an external device;
a control interface that receives user inputs and provides commands for the imaging unit; and
a planar electronic contact location contiguous with an outer surface of the imaging unit and configured to electronically couple to a planar electronic contact location contiguous with an outer surface of a housing having walls defining a cavity for receiving and releasably securing the imaging device,
wherein the imaging device is configured to communicate the image data to the external device in response to the electronic contact location of the imaging device being coupled to the electronic contact location of the housing, and
wherein the housing includes a cover configured to enclose the imaging device within the cavity and to become at least partially permeable to light to allow function of the lens.

19. The imaging device of claim 18, wherein the cover is configured to display at least one of a time, a date, or the image data in a manner that at least partially obscures a lens of the imaging device.

20. The imaging device of claim 18, wherein the housing includes a power source configured to supply a charge to the imaging unit in response to electronically coupling the electronic contact locations.

* * * * *